(12) United States Patent
Somma et al.

(10) Patent No.: US 12,255,930 B2
(45) Date of Patent: Mar. 18, 2025

(54) METHOD, NODE AND COMPUTER PROGRAM OF LAWFUL INTERCEPTION SYSTEMS AND NETWORKS

(71) Applicant: Telefonaktiebolaget LM Ericsson (publ), Stockholm (SE)

(72) Inventors: Alfredo Somma, Nocera Inferiore (IT); Michele La Torre, Roccapiemonte (IT); Alfonso Buonocore, Pagani (IT); Antonio Villa, Latina (IT); Daniele Gaito, Naples (IT); Lucia Savarese, Salerno (IT); Vincenzo Starace, Vico Equense (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 365 days.

(21) Appl. No.: 17/622,502

(22) PCT Filed: Jun. 27, 2019

(86) PCT No.: PCT/SE2019/050633
§ 371 (c)(1),
(2) Date: Dec. 23, 2021

(87) PCT Pub. No.: WO2020/263141
PCT Pub. Date: Dec. 30, 2020

(65) Prior Publication Data
US 2022/0263873 A1 Aug. 18, 2022

(51) Int. Cl.
*H04L 9/40* (2022.01)
(52) U.S. Cl.
CPC ................... *H04L 63/306* (2013.01)
(58) Field of Classification Search
CPC ...... H04L 63/306; H04L 63/302; H04L 67/10
See application file for complete search history.

(56) References Cited

U.S. PATENT DOCUMENTS

| 11,678,195 B2* | 6/2023 | Saghir | H04L 63/30 |
| | | | 709/224 |
| 2010/0125453 A1* | 5/2010 | Gibbs | G10L 19/167 |
| | | | 704/219 |

(Continued)

FOREIGN PATENT DOCUMENTS

| CA | 2966609 C | * | 3/2021 | ......... H04L 12/1407 |
| WO | WO-2009039710 A1 | * | 4/2009 | ......... H04L 63/1408 |

(Continued)

OTHER PUBLICATIONS

International Search Report and Written Opinion dated Mar. 18, 2020 in International Application No. PCT/SE2019/050633 (10 pages total).

(Continued)

*Primary Examiner* — Dereena T Cattungal
(74) *Attorney, Agent, or Firm* — Rothwell, Figg, Ernst & Manbeck, P.C.

(57) ABSTRACT

The present disclosure provide a node and method performed in the node for connecting at least two Lawful Interception (LI) sites (110) to the same Physical Networks Function (PNF) comprising a Point Of Interception (POI) or Virtual Networks Function (VNF) (140) comprising a virtualised Point Of Interception (vPOI) (142) controlled by a Triggering Control Function (TCF) (146), for lawful interception of the data communication sessions of targets defined by warrants comprising information identifying the targets, wherein said node (200) is adapted to configure the POIs/vPOIs/TCFs according to LI sites requests and policy requirements for each LI site, the node comprises a multi LI Site Database, mLSDB, (212) enabling the POI or vPOI/TCF to serve more than one LI site at the same time.

23 Claims, 15 Drawing Sheets

(56) References Cited

U.S. PATENT DOCUMENTS

| | | | | |
|---|---|---|---|---|
| 2012/0096145 A1* | 4/2012 | Le | ........................ | G06Q 50/265 709/224 |
| 2013/0057388 A1* | 3/2013 | Attanasio | ................ | G06Q 50/26 340/10.1 |
| 2016/0072850 A1* | 3/2016 | Zhang | .................. | H04L 63/306 726/12 |
| 2016/0112261 A1* | 4/2016 | Amato | .................. | H04L 63/306 709/220 |

FOREIGN PATENT DOCUMENTS

| | | | |
|---|---|---|---|
| WO | 2016/060597 A1 | | 4/2016 |
| WO | WO-2017203328 A1 | * | 11/2017 |
| WO | 2019/076424 A1 | | 4/2019 |

OTHER PUBLICATIONS

International Preliminary Report on Patentability dated May 21, 2021 in International Application No. PCT/SE2019/050633 (7 pages total).

ETSI GR NFV-SEC 011 V1.1.1, "Network Functions Virtualisation (NFV); Security; Report on NFV LI Architecture", Apr. 2018, Sophia Antipolis Cedex, France, XP014328979 (49 pages total).

ETSI TR 101 567 V1.1.1., "Lawful Interception (LI); Cloud/Virtual Services for Lawful Interception (LI) and Retained Data (RD)", Jan. 2016, Sophia Antipolis Cedex, France (103 pages total).

ETSI TS 133 108 V14.0.0, "Universal Mobile Telecommunications System (UMTS); LTE; 3G security; Handover interface for Lawful Interception (LI) (3GPP TS 33.108 version 14.0.0 Release 14)", Apr. 2017, Sophia Antipolis Cedex, France (323 pages total).

ETSI GS NFV-SEC 002 V1.1.1, "Network Functions Virtualisation (NFV); NFV Security; Cataloguing security features in management software", Aug. 2015, Sophia Antipolis Cedex, France (27 pages total).

ETSI GS NFV-SEC 004 V1.1.1, "Network Functions Virtualisation (NFV); NFV Security; Privacy and Regulation; Report on Lawful Interception Implications", Sep. 2015, Sophia Antipolis Cedex, France (15 pages total).

ETSI GS NFV-SEC 012 V3.1.1, "Network Functions Virtualisation (NFV) Release 3; Security; System architecture specification for execution of sensitive NFV components", Jan. 2017, Sophia Antipolis Cedex, France (17 pages total).

* cited by examiner

METHOD, NODE AND COMPUTER PROGRAM OF LAWFUL INTERCEPTION SYSTEMS AND NETWORKS

CROSS REFERENCE TO RELATED APPLICATION

This application is a 35 U.S.C. § 371 National Stage of International Patent Application No. PCT/SE2019/050633, filed Jun. 27, 2019.

TECHNICAL FIELD

The present technology relates to a method, a node and computer program of a Lawful Interception infrastructure.

BACKGROUND

In a Cloud-NFV environment, telecommunications and Lawful Interception, LI, functions are scattered across many different physical and virtual infrastructures under the control of diverse users and providers, as well as subject to different legal jurisdictions. The associated resources are frequently transient and may not have locality specified by traditional network-based identifiers.

For virtual infrastructure the national borders are not more a physical constrain. So, it is easy to foresee that in the future the telecommunications network can be international, an operator can create a global or continental or sub-continental telecommunications network.

In case of international network or in general in case of big network, some LEAs could request not to be connected to the same Mediation, e.g. in countries where intelligence agencies from other countries can work (peace keeping missions). It has not yet been provided a solution how to offer a separate mediation functionality to a LEA.

SUMMARY

It is one object of this disclosure to provide a technical solution of the problem to allow different LEAs to connect to different LI site of a LI system and network, and thereby separating LEAs from each other. It means that it could be requested to have more than one LI site in a network, so that a group of LEAs can share the same LI site, while one or more LEAs can use a different LI site.

It is an object of the following disclosure to provide a technical solution to said problem.

According to one aspect, a method and different embodiments of the method are provided wherein the method is performed in a node for connecting at least two Lawful Interception, LI, sites to the same Physical Networks Function, PNF, comprising a Point Of Interception, POI, or Virtual Networks Function, VNF, comprising a virtualised Point Of Interception, vPOI, controlled by a Triggering Control Function, TCF, for lawful interception of the data communication sessions of targets defined by warrants comprising information identifying the targets. Said node is adapted to configure the POIs/vPOIs/TCFs according to LI sites requests and policy requirements for each LI site. The node comprises a multi LI Site Database, mLSDB, enabling the POI or vPOI/TCF to serve more than one LI site at the same time. The method comprises handling warrants received from LI sites for distribution to POIs/vPOIs/TCFs, and distributing received IRD and/or CC from the POIs/vPOIs to one or more LI site by means of the database storing information regarding targets, the used POI or vPOI/TCF and which of the LI sites that sent the warrant/-s with the identified target.

According to further one aspect, a node and different embodiments of the node are provided wherein the node is configured for connecting at least two Lawful Interception, LI, sites to the same Physical Networks Function, PNF, comprising a Point Of Interception, POI, or Virtual Networks Function, VNF, comprising a virtualised Point Of Interception, vPOI, controlled by a Triggering Control Function, TCF, for lawful interception of the data communication sessions of targets defined by warrants comprising information identifying the targets. Said node comprises a node controller comprising one or more programmable processors configured to control configuration of the POIs/vPOIs/TCFs according to LI sites requests and policy requirements for each LI site, and to co-operate with an Administration Function, AF, of the node, said AF comprising a multi LI Site Database, mLSDB, enabling the POI or vPOI/TCF to serve more than one LI site at the same time. The AF component is configured to handle warrants received from LI sites for distribution to POIs/vPOIs/TCFs The node further comprises a virtualized multi Mediation Function and virtualized multi Delivery Function, vmMF/vmDF, component configured to distribute received IRD and/or CC from the POIs/vPOIs to one or more LI site by means of the database storing information regarding targets, the used POI or vPOI/TCF and which of the LI sites that sent the warrant/-s with the identified target.

According to yet one aspect, a computer program is provided comprising computer program code which, when run by a processor of the node (200), causes the node to perform the method steps of the method enclosed and described in this disclosure.

According to yet one aspect, a computer program product is provided comprising the computer program and a computer readable means on which the computer program is stored.

The advantage of the above presented techniques could be listed as follows:
  The use of more LI sites in a network;
  Strong separation among LEAs;
  Each LEA could have an own LI site;
  Possibility of creating international networks with LI site serving specific country laws;
  Networks could have multivendor LI node sites;
  Possibility to add LI sites to scale the LI capacity;
  Facilitate LI site geographical redundancy.

BRIEF DESCRIPTION OF THE DRAWINGS

The foregoing, and other, objects, features and advantages of the present technique will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the technique. However, it will be apparent to one skilled in the art that the present technique may be practiced in other embodiments that depart from these specific details. In other instances, detailed descriptions of well-known methods, devices, and circuits are omitted so as not to obscure the description of the present technique with unnecessary detail.

In relatively static, traditional network environments, a common set of Handover Interface (HI) specifications to receive and respond to structured expressions for Lawful Enforcement Agency (LEA) Lawful Interception (LI) production requests have been widely used over many years.

Figure 1:
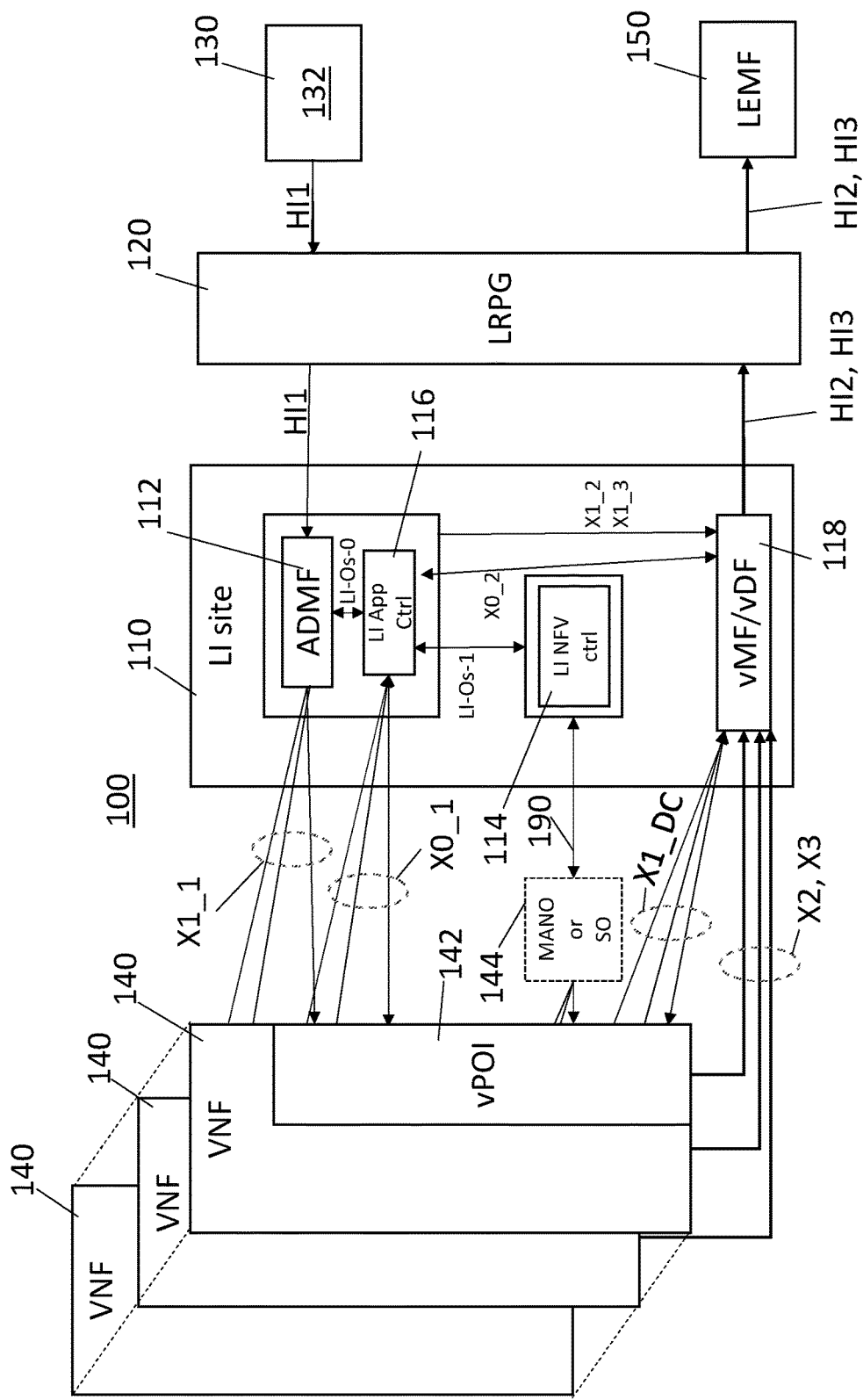
FIG. 1 is a block diagram of an example of a lawful interception system and network according to prior art.
Figure 2A:
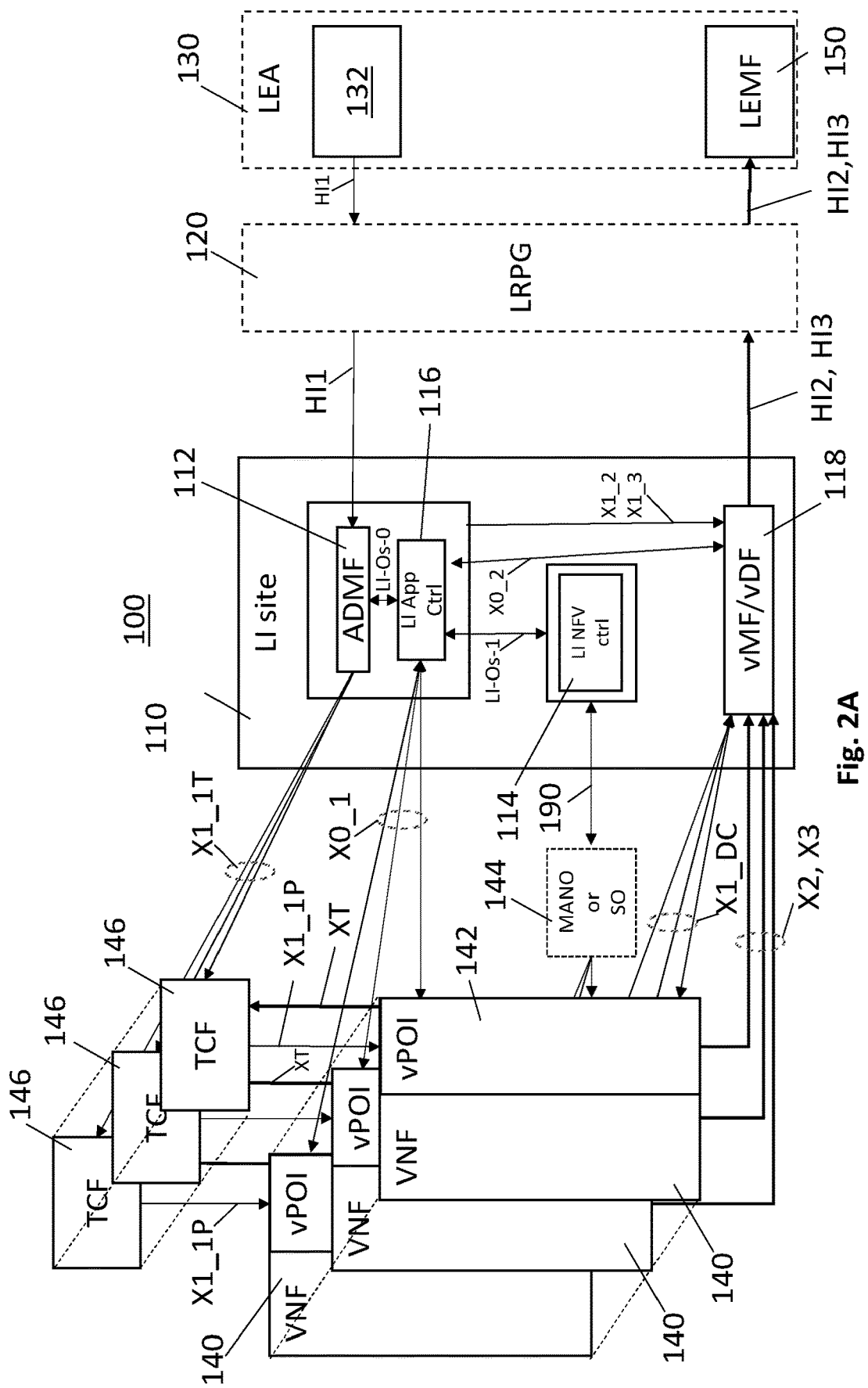
FIGS. 2A and 2B are block diagrams of simplified example of a Lawful Interception system and network according to prior art.
Figure 2B:
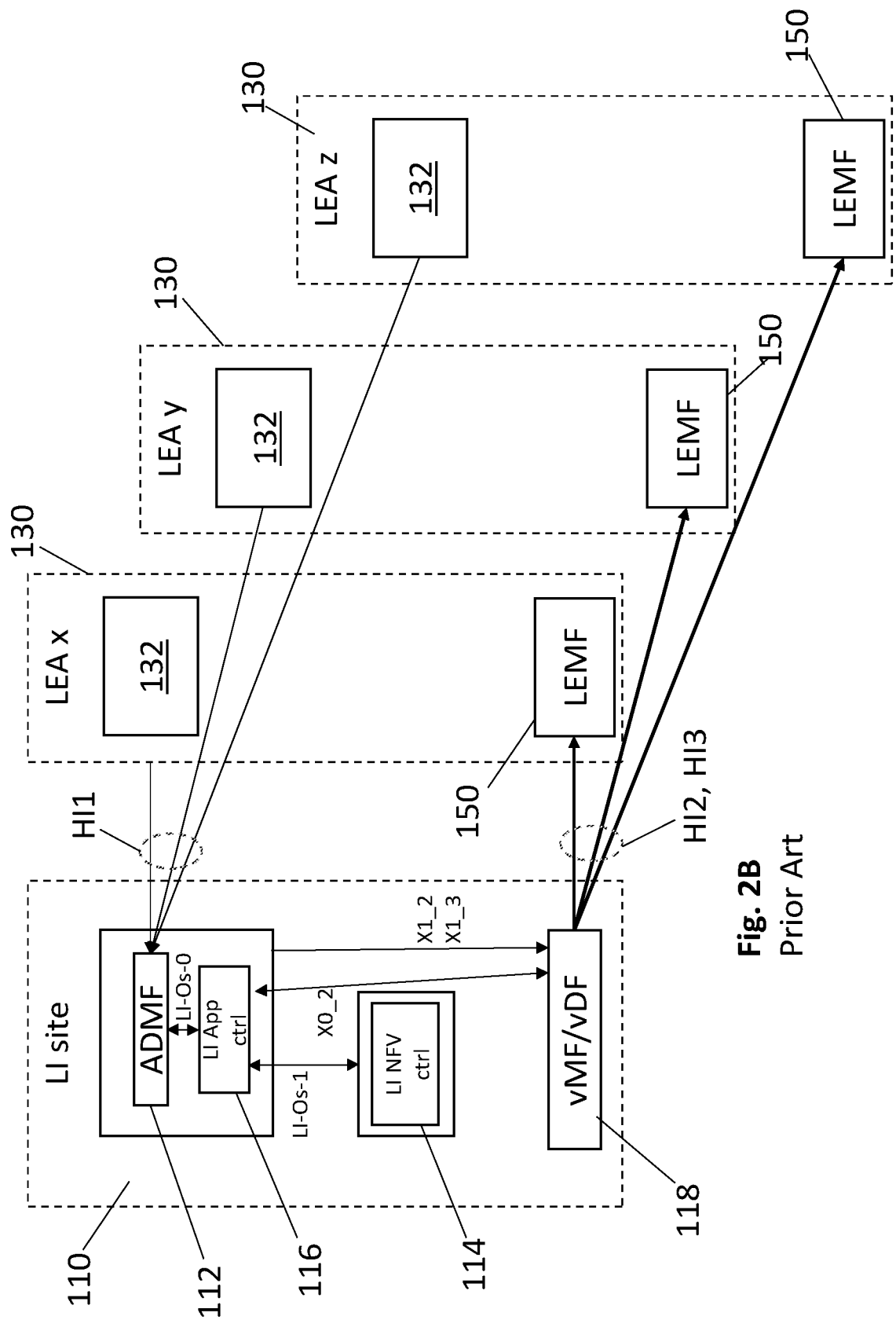

FIGS. 1, 2A and 2B are illustrating simplified examples of Lawful Interception systems and networks according to prior art.

The illustrated simplified embodiment of a Lawful Interception, LI, system and network 100 in FIG. 1 is a high level trusted virtualised LI architecture, and the LI architecture 100 of the illustrated system in FIGS. 2A and 2B is a simplified High-Level Low-Trust Virtualized LI architecture comprising triggered vPOIs.

In a traditional LI system, the interception of different targets data traffic and flows via Points of Interceptions, POIs, located in in nodes of service provider operated communications network. In case of Network Function Virtualization Infrastructure, NFVI, the LI site 110 controls the interception of different targets data traffic and flows via virtualized Points Of Interceptions, vPOIs, 142 located in Virtual Network Functions, VNFs, 140 of service provider operated infrastructure constituting a communications network.

Nowadays, the NFV LI Architecture 100 is based on the following functional entities:

Law enforcement Agency, LEA, 130
Virtualized Point of Interception, vPOI, 142
Triggering Control Function, TCF, (146 in FIG. 2A)
virtualized Mediation Function, vMF, 118
virtualized Delivery Function, vDF, 118
Administrative Function, ADMF, 112
System Information Retrieval Function (not shown)
Law Enforcement Monitoring Function, LEMF, 150
Virtualized Mediation and Delivery Function, vMF/vDF, 118 and Administrative Function, ADMF, 112, and LI NFV Controller, 114, are contained in the LI site 110. Each Virtual Network Function VNF, 140 is connected to an LI site, while an LI site can be connected to more than one VNF.

In a traditional LI architecture, each Physical Network Function PNF is connected to one LI site, while an LI site can be connected to more than one PNF.

Between the LEA 130 and LI site 110, an optional Lawful Interception Routing Proxy Gateway, LRPG, 120 may be inserted. It is a function with the primary purpose of proxying the LEMF from Management and Orchestration, MANO, 144, Software Defined Network (SDN) controller or other Communications Service Provider (CSP) personnel not authorized to know about LI. This function is optional but without it in full NFV network/SDN scenarios the LEMF will be visible to MANO and the SDN controllers.

To the same LI site can be connected more than one LEAs. All LEAs 130 in a network are connected to the same LI site that is unique for the network.

FIG. 2B illustrates that one LI site 110 of a LI system 100 described herein in FIGS. 1 and 2A more is able to serve more than one LEA 130. In the given example, three LEAs 130, denoted LEA x, LEA y, LEA y, are served by the same LI site 110. It should be understood that a LI site may serve less or more LEAs at the same time. Each LEA 130 comprises a warrant issuing authority 132 sending warrants over the interface HI1 to the ADMF 112 and a LEMF 150 receiving IRD via the interface HI2 and CC over the interface HI3.

The Point of Interception, POI, or vPOI, 142 is a VNF 140 internal interception function, that detects the target communication, derives the Intercept Related Information, IRD, or Communications Content, CC, from the target communications and delivers the vPOI Output to the mediation function of the LI site. A vPOI may be embedded within a VNF or separate from a VNF with which it is associated.

POIs/vPOIs are divided into two categories.

Directly Provisioned POIs/vPOIs:

Such POIs/vPOIs detect the target's communications that need to be intercepted, and then derive the intercept related information or communication contents from that target communications.

Triggered POIs/vPOIs:

The Triggered POIs/vPOIs detect the target communications based on the trigger received from an associated Triggering Control Function, TCF, and then derives the intercept related information or communication contents of target communications.

The example in the illustrated Lawful Interception system and network 100 in FIG. 1 is an architecture wherein the virtual Points of Interceptions, vPOIs, are Directly Provisioned, while the example of FIG. 2 the vPOIs are triggered vPOIs.

In the following components and interfaces of the LI systems in FIGS. 1, 2A and 2B are described in more detail.

The Virtualized Network Function, or VNF, 140 is a virtualized node of a telecommunications network for handling user's data traffic and data flows, and wherein a target's data traffic and data flows are intercepted by means of a virtualized Point of Interception, or vPOI, 142. The vPOI 142 is configured to send the Intercept Related Data, IRD, and Communications Content, CC, of a target's data traffic and data flows towards the LI site 110 requesting the interception.

The LI site comprises an Administrative Function, or ADMF, 112, LI controller components 114, 116, and a virtualized Mediation Function and virtualized Delivery Function vMF/vDF 118 and a number of interfaces.

The function of the LI controller (ctrl) components 114, 116, is to create, modify, delete, audit the vPOIs 142 and vMF/vDF 118 vPOI configuration during their lifecycle. It does not handle LI target administration.

The LI controller (ctrl) comprises two components: a LI controller at network service application level, or LI App ctrl, 116, and LI controller at NFV (Network Function Virtualization) level, or LI NFV ctrl, 114.

The sub-function of the LI App ctrl 116 is to:
- activate, configure and audit the configuration of vPOIs and/or vMF/vDF. As an example of such configuration is to configure certificates for SSL, modify triggering options and apply national parameters;
- Notify ADMF the node is ready for configuration for interception;
- Act as LI root of trust at application level, e.g. maintaining/verifying vPOI certificates/keys secure copy.

The sub-function of the LI NFV ctrl 114 is to:
- check if LI needed for a VNF according to the policy communicated by ADMF;
- enforce and maintain LI VM/VNF security constraints configuration via MANO and/or SO security support (VM Virtual Machine);
- audit security of LI vPOI and vMF/vDF (via SO or MANO functions).

The ADMF 112 has the following function beside the legacy functions defined in ETSI and 3GPP LI specification:
- keep track of dynamic creation, modification, termination of vPOIs and their types, vMF/vDF and network topology. It is expected to be updated by notification from LI NFV ctrl 114;
- execute the warrant request according to the latest vPOI VNF type and network topology;
- order audit of secure configuration of the vPOI application configuration to
- LI app controller and of the VNF level security to LI NFV ctrl;
- act as the root key and certificate authority (CA) for all other LI functions and components.

The vMF/vDF 118 is a virtualized LI function of MF/DF. The legacy definition of MF/DF applies.

As per FIG. 2A, the TCF is a LI specific VNF which:
- fully meets LI security requirements for holding and processing sensitive LI information (e.g. target lists);
- is provisioned with the full target list by the ADMF (or at least that portion of the target list applicable for the vPOI(s) it is managing);
- is responsible for processing signalling session information for all communications visible to the VNFI in which the vPOI is embedded;
- is responsible for identifying which communications match and target list provided by the ADMF;
- is responsible for informing the vPOI to start and stop intercepting specific communications and handing them over as per the trusted scenario in FIG. 1.

A number of internal and external interfaces of the LI site are defined in the ETSI and 3GPP LI specifications. The above identified components of the LI system uses said defined interfaces for communicating necessary information between them. Some of the interfaces are internal LI Site interfaces: Li-Os-0, Li-Os-1, X1_2, X1_3, and X0_2. Said interfaces enable communication of information between components within the LI site. Other interfaces are denoted as external interfaces enabling communication between components of the LI site with other components and entities of the LI system external to the LI site. The external interfaces are: NFV level I/F Conf VNF security, X0_1, HI1, HI2, HI3, X1, X1_1, X2, X3, and X1_DC.

The LI-Os-0 interface connects the Li App Ctrl and ADMF, and it used for exchanging New/Changed LI function Info for the vPOI and/or vMF/vDF, and LI configuration parameters of the Virtualized Network Function Instances, VNFI, and Virtualized Network Function components, VNFCI. The interface may be internal and external depending on whether the ADMF and LI App ctrl are implemented as a separated or combine function.

The LI-Os-1 interface connects the LI NFV ctrl to ADMF function. Following data is sent from the LI NFV ctrl to the ADMF:
- info/notification about new/changed/delete VNFI (with vPOI), its type and LI initial connection parameters details;
- VNF security Audit result;

From ADMF to LI NFV ctrl:
- request to secure VNFI, e.g. via security policy and geo location constraints, etc. A basic security policy could the VNFI type, which is expected to contain a vPOI function.

The internal interface X0_2 connects the LI App ctrl and the vMF/vDF. The external interface X0_1 connects LI App ctrl and the vPOIs. In the direction from LI App ctrl to vMF/vDF and vPOI, the following examples of information is sent:
- configure/view LI application parameters, such as LI activation and deactivation, SSL (Secure Socket Layer) keys setup, national options selection, etc.
- Audit LI parameters configuration.

In the direction from vMF/vDF and vPOIs to LI App ctrl, the following examples of information are sent:
- initial connection establishment of a new configured vPOI/vMF/vDF to the LI App;
- LI application logs/alarms about configuration parameters anomalies;
- configuration parameters audit response.

HI1 is an interface used for forwarding warrants from a warrant issuing authority 132 of a LEA 130 towards the ADM F 112.

HI2 is an interface used for forwarding Information Related Data, IRD, from the vMF/vDF 118 towards a Law Enforcement Monitoring Function, LEMF, 150.

HI3 is an interface used for forwarding Communication Content, CC, from the vMF/vDF 118 towards a Law Enforcement Monitoring Function, LEMF, 150.

The interface X1 includes the interfaces X1_1, X1_2 and X1_3. Said interfaces are used for forwarding from the ADMF 112 target configuration information to configure targets in the vPOI via X1_1, in the vMF via X1_2 and the vDF via X1_3.

Interfaces X2 and X3 are used for forwarding IRD and CC, respectively, from the vPOI to the vMF/vDF. The interface X1_DC is used by the vPOI and vMF/vDF to inform each other of changes in the NFV environment. Examples of such changes are scaling, mobility, etc.

X1, X1_1, X1_2, X1_3, X2, X3, HI1, HI2, and HI3 have the basic functionality of existing legacy HI interfaces defined in ETSI TS 133 108 [i.6] and ETSI 102 232-1 [i.2] but with additional security mechanisms/transport protocol and data components required to support NFV deployments.

For enabling communication of information between the LI NFV ctrl 114 and the MANO or SO is an interface 190 defined. In the direction from LI NFV ctrl to MANO or SO, the following examples of information are sent:

instrument security setup to MANO or SO for the VNFI containing the vPOI. Examples of such setup information are trusted platform, geo loc, resource constraints, etc.;

audit of VNFI security constraints requests.

In the other direction, from the MANO or SO to the LI NFV ctrl is forwarded:

info/notification of a new VNF initiation;

VNF security constraints audit result.

In the scenario of FIG. 2A, wherein external TCFs 146 are used, a number of further interfaces are defined.

Interface X1_1T between an ADMF 112 and a TCF entity 146 is equivalent of the interface X1_1 as described in here above. The X1_1T is used by the ADMF to provide the TCF with target lists and other information required to perform and maintain interception.

Interface X1_1P is used by a TCF 146 to provide a vPOI 142 with specific service and/or communications stream targeting instructions.

Interface XT is used by a vPOI 142 to provide to a TCF with a copy of all signalling or other service access control information for all communications visible to the vPOI.

One problem with the above described LI system and scenarios described above is that one LI site has to serve multiple LEAs and only one LI site is allowed per network. It is therefore not possible to accomplish a complete separation between LEAs.

In the following of this description, it is proposed a solution of said problem. The proposed solution allows and standardizes the use of more than one LI site in a network and enables a complete separation on duty among LEAs that are connected to the different LI sites.

According to the solution, a new node is inserted among POIs and LI Sites, so that each POI does not see that there are more LI sites, and LI sites can work without any interference among them. Said node is hereafter denoted, Multi LI Target List, MLTL, node.

The new MLTL node allows the connection of a number of LI sites in a network without impacts (or major impacts) in existing LI sites and PNFs/VNFs.

As an option new POIs/TCFs can embed completely or partially the MLTL functionality as well MLTL can embed TCF functionality.

Figure 3A:
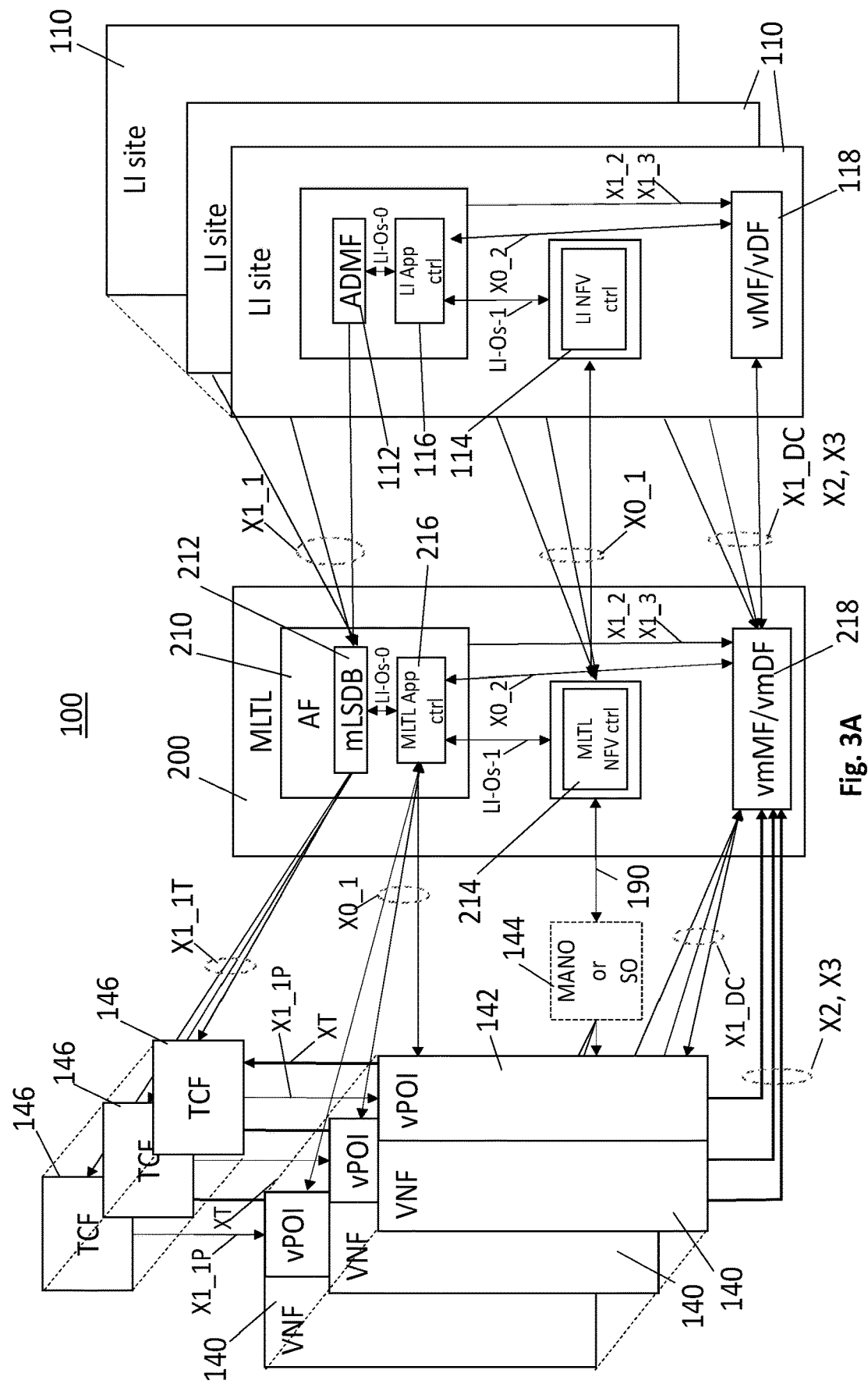
FIGS. 3A and 3B are a block diagram of a LI system and network infrastructure 100 according the proposed solution herein.
Figure 3B:
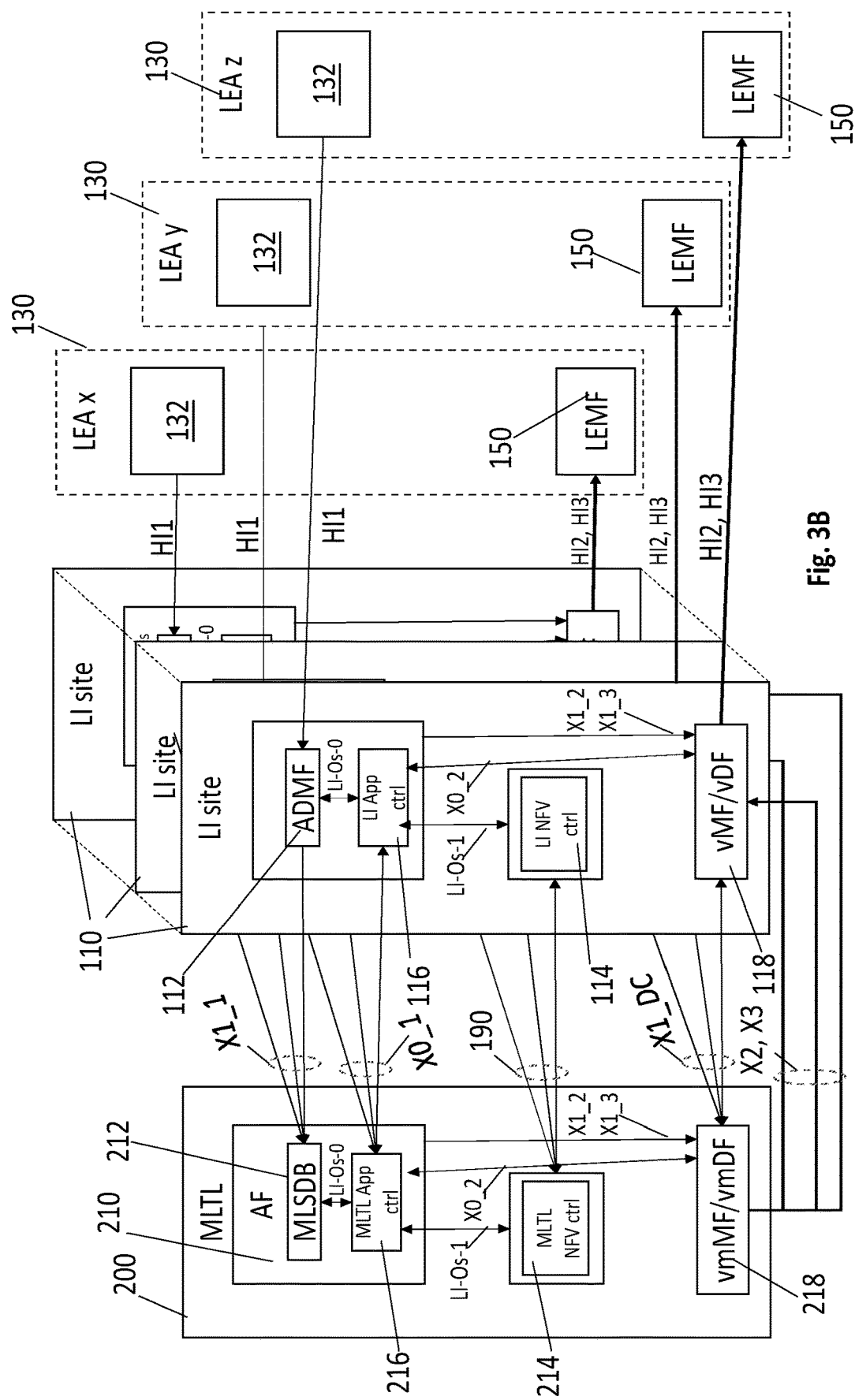

In FIGS. 3A and 3B are illustrated a LI system and network infrastructure 100 according the proposed solution herein.

As illustrated in FIGS. 3A and 3B, the LI system and network 100 comprises a new node 200, hereafter denoted MLTL node. The other components and interfaces of the LI system and network are identical to the components and interfaces of the LI systems and networks described herein above in FIGS. 1, 2A and 2B and will therefore not be described further. Identical components and interfaces are identified by the same reference numbers and abbreviations or acronyms.

The LI system and network 100 is a High level description of a MLTL node in a Low-Trust Virtualized LI architecture.

The MLTL node 200 is used for connecting at least two LI sites 110 to the same Virtual Networks Functions, VNFs, 140 each comprising a virtualised Point Of Interception vPOI 142 controlled by a Triggering Control Function, TCF, 146 for lawful interception of the data communication sessions of targets defined by warrants comprising information identifying the targets, and which warrants are received from different LEAs 130 connected to said at least two LI sites 130.

In a non-virtualized physical network, the VNFs 140 comprising vPOIs 142 corresponds to Physical Networks Functions, PNFs, 140 comprising a Point Of Interception, POIs, 142.

Without limitation, FIG. 3B illustrates an embodiment wherein each LI site 110 serves one LEA 130 each. However, of course one LI site may serve more than one LEA. It is by means of the MLTL node possible to connect LEAs in the same network to different LI sites, so that each LEA or group of LEAs can use an own LI site to be completely separated to the other LEAs of the network.

The MLTL node 200 mainly works like a proxy between vPOIs 142 and LI node sites 110. A LI node site 110 authenticates itself before performing any operation. Thanks to that authentication, the MLTL node can manage target list access and related reporting on LI site base.

Furthermore, a security policy management function provides rules about VNF configuration. The MLTL node 200 is located in a secure location which fully meets LI security requirements.

Figure 12:
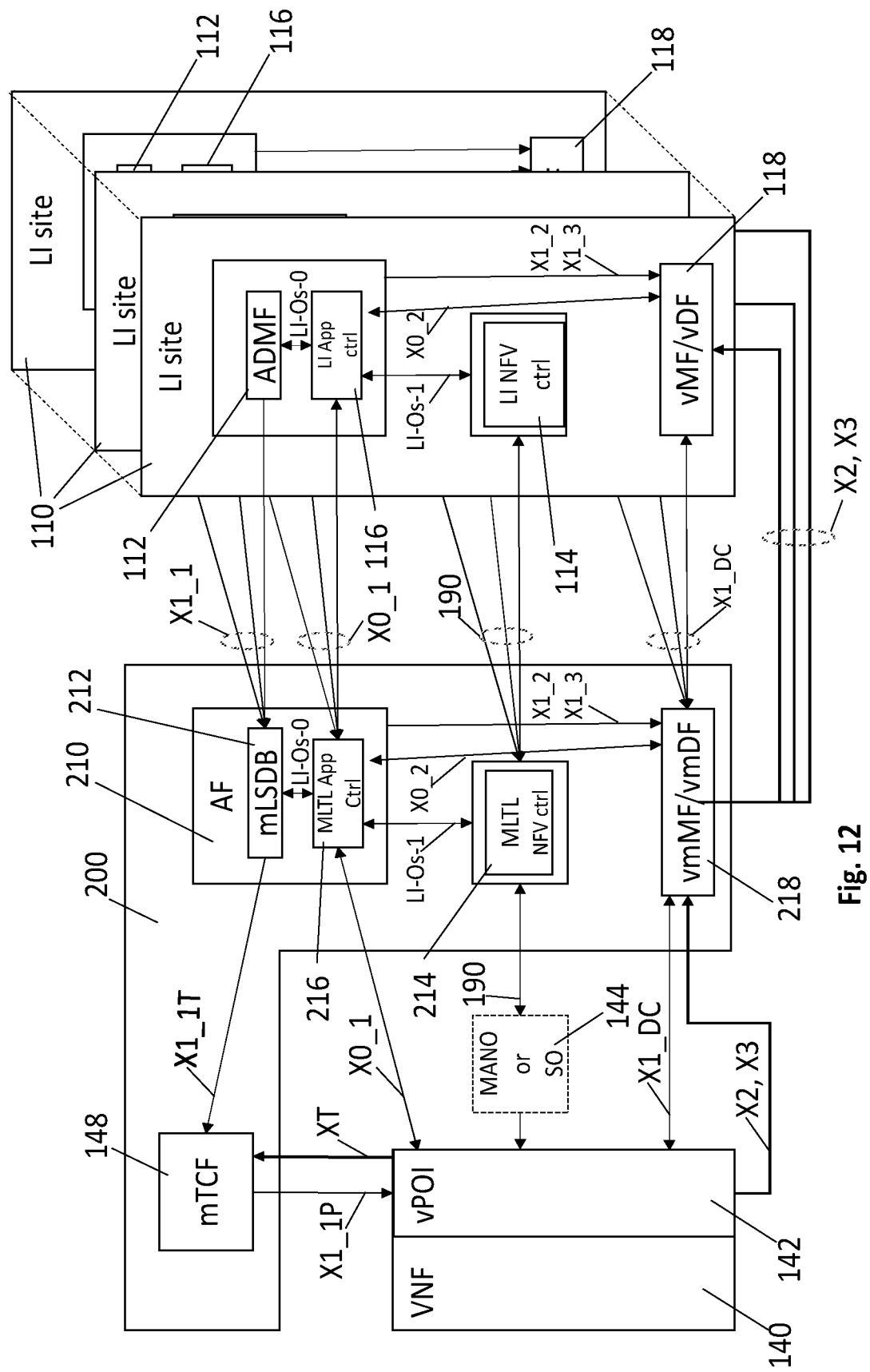
FIG. 12 is a block diagram of further one embodiment of a LI system and network infrastructure 100 according the proposed solution herein.
Figure 13:
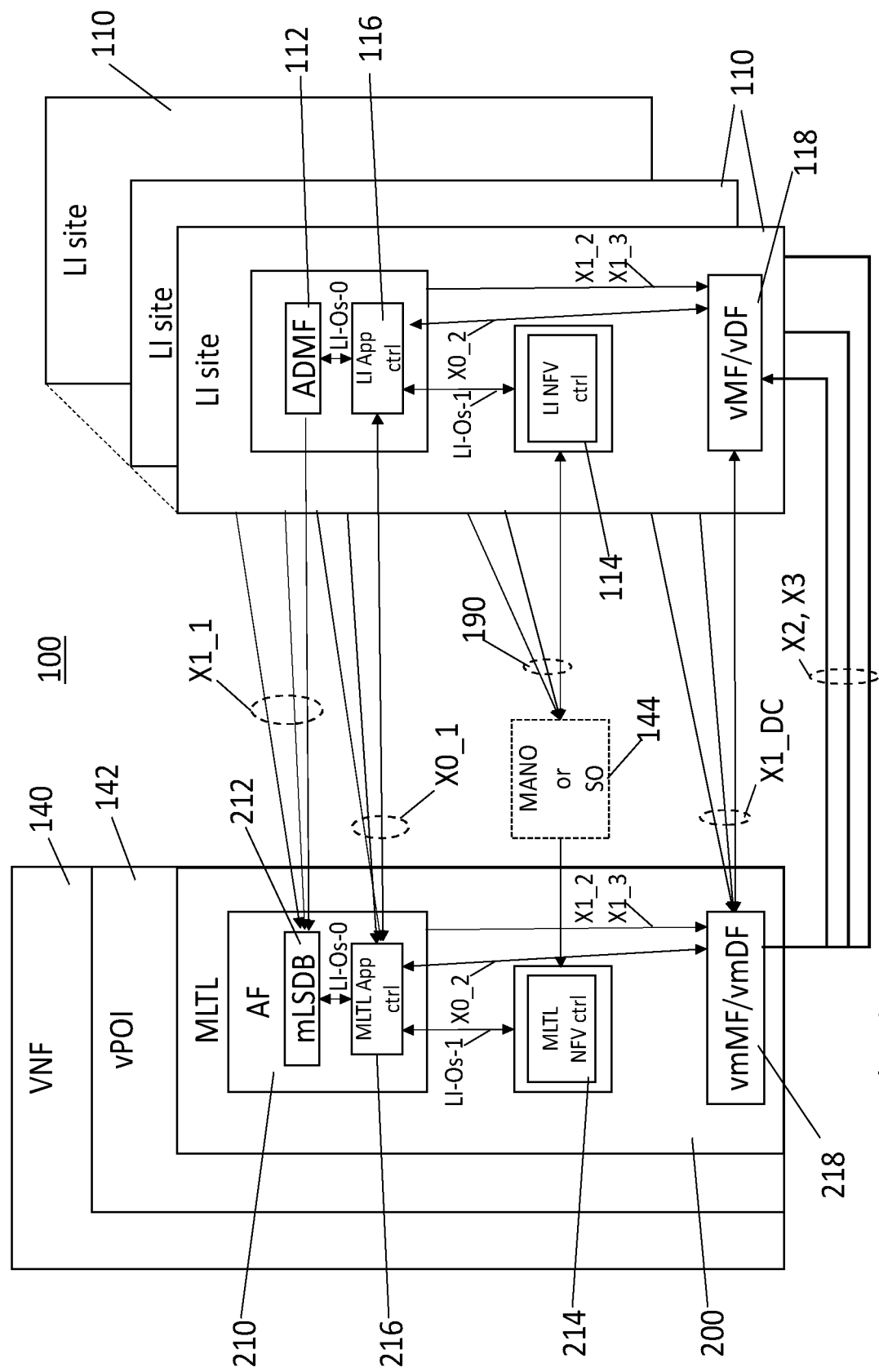
FIG. 13 is a block diagram of further one embodiment of a LI system and network infrastructure 100 according the proposed solution herein.

To allow the use of more LI sites, the new logical node MLTL 200 is configured to all existing LI site to work as a single LI site in the network, and at the same time, all POIs/vPOIs/TCFs connected to PNFs/VNFs can interwork with the MLTL in the same way they interworked with the LI site. This means that existing LI sites and POIs/vPOIs/TCFs can continue to work in the same way without changes or with minor changes. Since POIs, vPOIs, TCFs and MLTL must be all deployed in protected infrastructure which fully meets LI security requirements close to the VNF, the following configuration options apply:

MLTL and POIs/vPOIs/TCFs are physically separated functions. These configuration options are illustrated in FIG. 3A;

MLTL can embed TCF function. Said configuration option is illustrated in FIG. 12.

new POIs/vPOIs/TCFs can embed MLTL function. Said configuration option is illustrated in FIG. 13;

As the LI site, which consists of ADMF, LI Controller and vMF/vDF, the MLTL node 200 comprises:

Administration Function comprising a multi LI site Data Base (mLSDB) 212 and a MLTL controller at network service application level, MLTL App ctrl, 216;

a MLTL controller at network service application level, MLTL App ctrl, 216. The MLTL controller at network service application level, MLTL App ctrl, 216 and the MLTL controller at NFV level, MLTL NFV ctrl, 214 are together forming a MLTL controller;

virtual multi Mediation Function/Delivery Function (vmMF/vmDF) 218;

optionally a TCF function embedded in MLTL, herein denoted as a multi TCF, or mTCF. Said option is illustrated in the embodiment of FIG. 12, mTCF 148.

The component multi LI Site Database, mLSDB 212, provide the same functionality as an ADMF of a LI Site and a number of other functionalities:

Collecting information from warrants from all LI sites. The mLSDB collects information from warrants received from all connected LI sites on X1_1 interface;

Providing target list management on LI site base. The mLSDB provides targets list administration right on LI site base. The warrant contains the target to be monitored. LI Site receives the warrants from the authority. LI Site extracts from the warrants the target list (and all useful) monitoring information about the target). The mLSDB is configured to add to the target list an indication of which LI site that requests the monitoring of a target.

Forwarding target lists to vPOI or TCF. The mLSDB forwards the target lists to vPOI via X1_1 interface or TCF via X1_1T interface.

Forwarding the targets from different LI sites only once to the vPOI/TCF. The mLSDB provides target normalization function toward vPOI or TCF, i.e. targets from different LI sites are forwarded only once to the vPOI/TCF with the capabilities to satisfy the requirements from all the associated LI sites.

Registering dynamic creation, modification, termination of vPOIs and their types, vmMF/vmDF and network topology. The mLSDB may keep track of dynamic creation, modification, termination of vPOIs and their types (e.g. vCSCF, vSBG, vEPG etc.), vMF/vDF and network topology. It is expected to be updated by notification from a MLTL NFV controller.

Ordering audit secure configuration of the vPOI application configuration to the MLTL app controller and of the VNF level security to the MLTL NFV controller The mLSDB may order audit of secure configuration of the vPOI application configuration to the MLTL app controller and of the VNF level security to the MLTL NFV controller.

Acting as the root key and Certificate Authority (CA) for all other MLTL functions and components.

The mLSDB 212 may be configured to receive warrants from an ADMF 112 over the X1_1 interface, to collect and store the received warrants and their target information. The mLSDB 212 is configured to forward the target lists to vPOI 142 via X1_1 interface or TCF 146 via X1_1T interface. The mLSDB 212 is further configured to communicate with the MLTL App ctrl 216 via the interface Li-Os-0 and the vmMF/vmDF 218 via interfaces X1_2 and X1_3, respectively.

Said MLTL node 200 comprises at least one controller, denoted herein as MLTL controller or MLTL node controller, 214, 216.

The MLTL controller 214, 216 is configured to provide the same functionality as provided by a LI controller in a LI site, but the MLTL controller is further configured to interface and communicate with all LI controllers in the LI sites connected to the MLTL node 200. The MLTL controller is further adapted to configure the POIs/vPOIs/TCFs according to LI sites requests and policy requirements for each LI site 110. The MLTL controller mediates among all LI control requests. LI control requests from different LI Site could be in contrast, and in that case the MLTL has to mediate among them.

According one embodiment the MLTL node controller 214, 216 also provide processor and/or processing capacity to the mLSDB 212 and its software. In further embodiments, the mLSDB may have its own processor capacity for running the mLSDB software.

The MLTL node controller comprises one or more programmable processors configured to provide the node functionality, e.g. control configuration of the POIs/vPOIs/TCFs according to LI sites requests and policy requirements for each LI site, and to co-operate with the Administration Function, AF, 210 of the node, said AF comprising a multi LI Site Database, mLSDB, 212 enabling the POI or vPOI/TCF to serve more than one LI site at the same time. The MLTL node 200 further involves computer program/software comprising computer program code which, when run by a processor 212, 214, 216 of the node 200, causes the node to perform its intended function. The MLTL node 200 further involves a computer program product comprising a computer program/software and a computer readable means on which the computer program is stored. It is therefore possible to design the processor circuitry of MLTL controller in many different ways. The described embodiments of this disclosure are only a few examples of processor circuit architectures and should therefore not be regarded as limitations of the different available possibilities to design a controller function of a node.

According to some embodiments, the MLTL controller may be achieved by two controller component entities/processors 214, 216 providing different functionality equivalent to an LI controller being divided in two corresponding component entities. Said two component entities of the MLTL controller is a MLTL controller at network service application level, MLTL App ctrl, 216 and a MLTL controller at NFV level, MLTL NFV ctrl, 214.

For enabling the POI or vPOI/TCF to serve more than one LI site at the same time by means of the functionalities of the MLTL node 200, the Administration Function 210 comprising the mLSDB 212, MLTL App ctrl 216, MLTL NFV ctrl 214 and the virtual multi Mediation Function/Delivery Function, vmMF/vmDF, 218 are configured to co-operate.

The MLTL App ctrl 216 is adapted to configure the vPOIs according to LI sites request via the X0_1 interface. In the case of not compatible requests, a priority can be used to decide the correct configuration to do. When MLTL app ctrl 216 notifies mLSDB 212 via the LI-Os-0 interface, the MLTL node 200 is ready for configuration and for interception actions, the LI NFV ctrl 214 is informed via the LI-Os-1 interface. The vmMF/vmDF and the LI NFV ctrl communicate and exchange information via the X0_2 interface.

The MLTL NFV ctrl 214 follows the policy communicated by the mLSDB via the LI-Os-0 interface, MLTL App ctrl 216 and the LI-Os-1 interface. The MLTL NFV ctrl 214 is configured to mediate on policy from LI NFV controllers via the interface 190, NFV level I/F Conf VNF security. A basic security policy may be the VNFI type (e.g. vCSCF, vMME, vEPG) which are expected to contain a vPOI function. The LI security policy is provisioned to LI NFV controller. LI policy includes the list of VNF types which contain vPOI and the specific constraints to apply (e.g. resource affinity and specific geo location).

This enables the LI NFV controller to decide when to apply LI restrictions to a VNF created by VNFM.

MLTL NFV Controller 214 shall apply the security policy for each LI site.

In case of audit ordered by a LI NFV ctrl 114, the MLTL NFV ctrl 214 is configured to decide whether to interrogate the mLSDB 212 or check the vPOI 142 via SO or MANO 144. In both cases, only information related to the requiring LI site 110 must be provided. In case of embedded MLTL (see FIG. 13), the audit is received by the MANO or SO 144, and it is executed by the MLTL NFV ctrl 214 providing info only related to the LI site originating the audit order. The described interrogating process makes use of the interfaces 190, NFV level I/F Conf VNF security between the MLTL NFV ctrl 214 and the MANO or SO 144 or LI NFV ctrl 114.

The virtual multi Mediation Function/Delivery Function, vmMF/vmDF, 218, is configured to provide X2, X3 dispatching function toward vMF/vDF of the LI sites, i.e. IRD received over the X2 interface and CC received over the X3 interface from vPOI 142 are dispatched toward all the LI sites associated to the target.

Further, the vmMF/vmDF is configured to exchange information changes, e.g. scaling and mobility information, with the vPOIs 142 and vMF/vDF 118 via X1_DC interfaces.

The dispatched X2 IRD and X3 CC match the LI site requirements associated to the target.

Thus, the MLTL node 200 comprises a node controller comprising one or more programmable processors 214, 216 configured to control configuration of the POIs/vPOIs/TCFs according to LI sites requests and policy requirements for each LI site, and to co-operate with an Administration Function, AF, 210 of the node, said AF comprising a multi LI Site Database, mLSDB, 212 enabling the POI or vPOI/TCF to serve more than one LI site at the same time, wherein:

the MLTL administration Function AF 210 is configured to handle warrants received from LI sites for distribution to POIs/vPOIs/TCFs; and a virtualized multi Mediation Function and virtualized multi Delivery Function, vmMF/vmDF, 218 configured to distribute received IRD and/or CC from the POIs/vPOIs to one or more LI site by means of the database 212 storing information regarding targets, the used POI or vPOI/TCF and which of the LI sites that sent the warrants with the identified target.

The handling of warrants received from connected LI sites thus involves to collecting information from warrants from all LI sites, providing target list management on LI site bas and forwarding target lists to vPOI or TCF.

According to one embodiment, the MLTL node 200 comprises a mLSDB 212 that is configured to execute a warrant handling process S200 comprising the steps of:

receiving from an LI site a warrant comprising information identifying a target;

identifying by means of the database if the target of a received warrant already is present in the database.

The warrant handling process may further comprise the steps of:

if the target is not present in the database, updating the database regarding information from the LI site issuing the warrant;

forwarding the received warrant to the POI and/or vPOI/TCF.

The warrant handling process S200 may further comprise the steps of:

If the target is present in the database, updating the database regarding information changes from the LI site issuing the warrant;

If information change of target, forwarding the received warrant to the POI and/or vPOI/TCF.

The node may further be configured to by means of the information stored in the mLSDB 212 to forward the targets from different LI sites only once to the vPOI/TCF.

The node 200 further comprise a virtualized multi Mediation Function and virtualized multi Delivery Function, vmMF/vmDF, 218 configured to distribute received IRD and/or CC from the POIs/vPOIs to one or more LI site by means of the database 212 storing information regarding targets, the used POI or vPOI/TCF and which of the LI sites that sent the warrants with the identified target.

The node controller 214 may further be configured for handling audit information by:

receiving an audit order from one of the LI sites;

sending based on policy rules stored in the mLSDB an interrogation to the mLSDB or POIs/vPOIs or Security Orchestrator 144 or Management and Orchestrator 144 for audit information;

receiving a response regarding audit information;

providing audit information related to the LI site originating the audit order.

The node 200 may be configured to act as a proxy between one or more POI/vPOI/TCF and one or more LI sites, wherein the mLSDB 212 and vmMF/vmDF 218 of the node are configured to communicate with POI/vPOI/TCF 142;146 as an ADMF and vMF/vDF, respectively, of an LI site, and vice versa.

According some embodiments, the TCF is located in the node 200, said TCF controlling at least one vPOI. When the TCF is controlling more than one vPOI, it is denoted multi TCF, mTCF, 148.

According some embodiments, the TCF may be embedded within the POI/vPOI.

Figure 4:
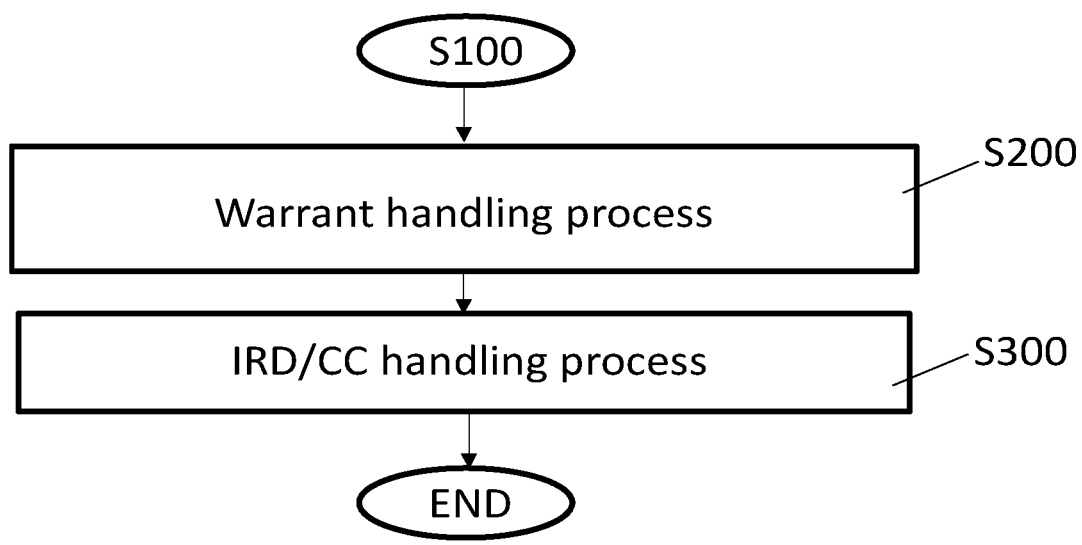
FIG. 4 is a flowchart of the method S100 according the solution provided herein.

FIG. 4 is a flowchart of the method S100 according the solution provided herein.

Thus, the MLTL node 200 is configured to by means of a method S100 connect at least two LI sites 110 to the same Physical Networks Function, PNF, comprising a Point Of Interception, POI, or Virtual Networks Function, VNF, 140 comprising a virtualised Point Of Interception, vPOI, 142 controlled by a Triggering Control Function, TCF, 146 for lawful interception of the data communication sessions of targets defined by warrants comprising information identifying the targets. Said node 200 is adapted to configure the POIs/vPOIs/TCFs according to LI sites requests and policy requirements for each LI site. The node comprises a multi LI Site Database, mLSDB, 212 enabling the POI or vPOI/TCF to serve more than one LI site at the same time by means of the method comprising the process of:

S200: Warrant handling process:—Handling and administrate warrants received from LI sites for distribution to POIs/vPOIs/TCFs warrants; and S300: IRD/CC handling process S300: Distributing received IRD and/or CC from the POIs/vPOIs to one or more LI site by means of the database (212) storing information regarding targets, the used POI or vPOI/TCF and which of the LI sites that sent the warrant/-s with the identified target.

Figure 5:
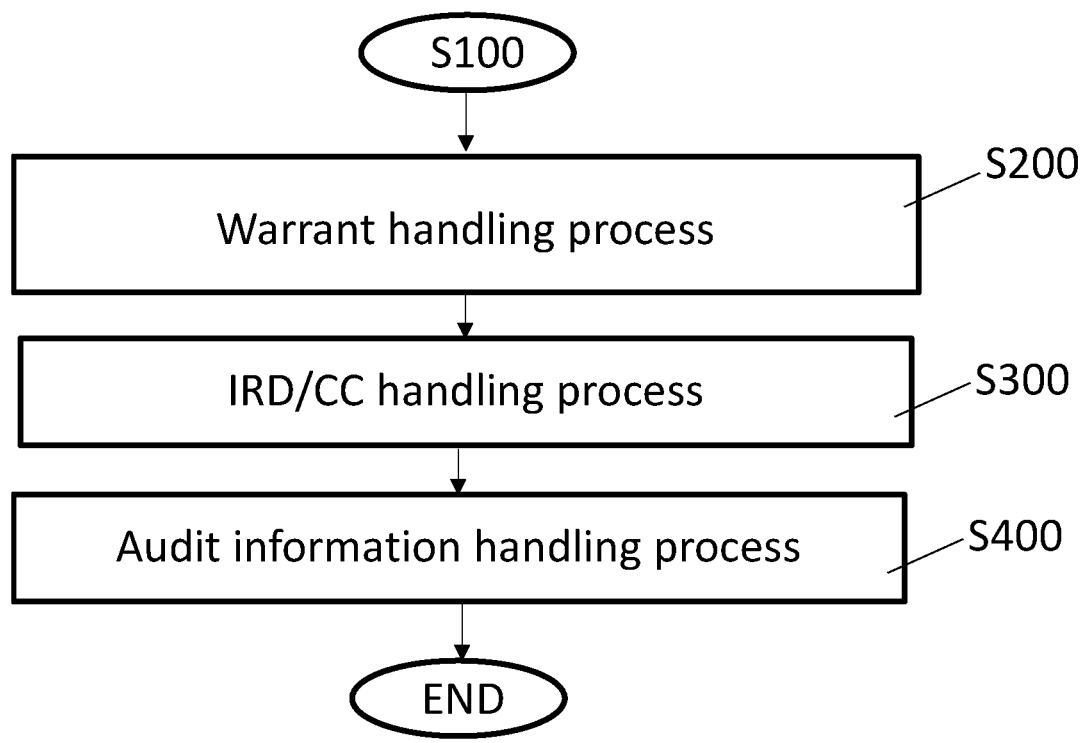
FIG. 5 is a flowchart of an embodiment of the method S100 according the solution provided herein.

FIG. 5 is a flowchart of an embodiment of the method S100 according the solution provided herein.

The method S100 may further involve an audit information handling process S400.

The three processes S200, S300 and S400 are described hereafter in more details.

Figure 6:
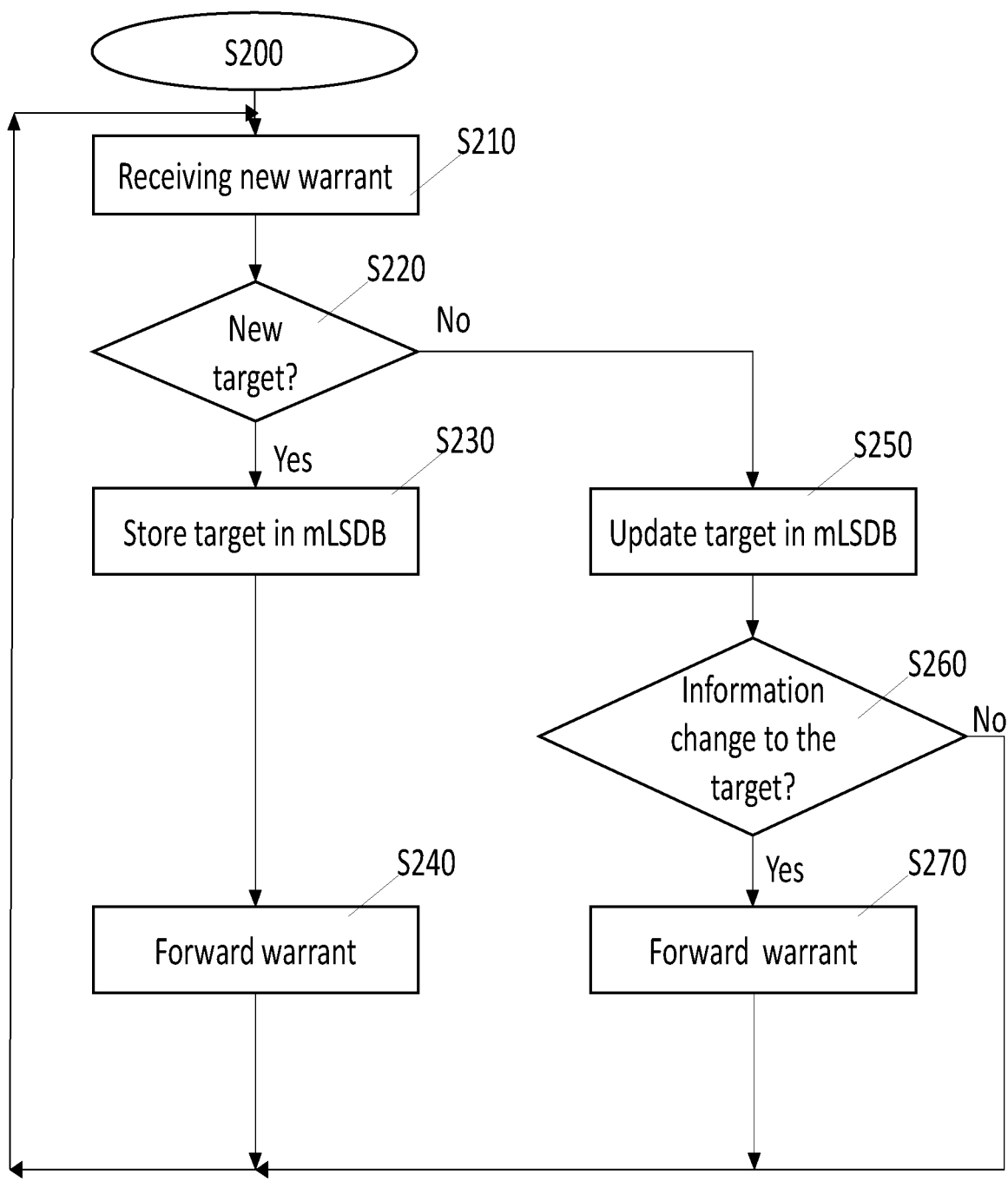
FIG. 6 is a flowchart of a warrant handling process S200.

FIG. 6 is a flowchart of a warrant handling process S200. Said warrant handling process S200 enables the MLTL site to operate between different LI sites and vPOIs/TCFs by collecting and distributing received warrants and their information. The process S200 is described hereafter with reference to FIG. 6.

The method S100 further comprises a warrant handling process S200, comprising the steps of:

S210: Receiving from an LI site a warrant comprising information identifying a target.

Step S210 is indicated as "Receiving new warrant" in the flowchart. The warrant handling process is triggered if a new warrant is received on X1_1 from an LI site.

S220: Identifying by means of the database if a target of a received warrant already is present in the database. This test step is indicated in the flowchart as "New target?".

If the received warrant comprises a new target, step S200 continues with step S230, wherein:

S230: —if the target is not present in the database, updating the database regarding information from the LI site issuing the warrant.

Step S230 is indicated as "store target in mLSDB".

S240: —forwarding the received warrant to the POI and/or vPOI/TCF. This is indicated in the flowchart as "Forward warrant". The received warrant is forwarded in dependency on the LI structure, i.e. the warrant is sent to vPOI on the X1_1 interface or X1_1T interface to the TCF.

If the received warrant comprises a target already stored in the mLSDB, step S200 continues with step S250, wherein:

If the result of the test step S220 is "No", the method performs step S250, which is indicated as "update target in mLSDB".

S250: If the target is present in the database, updating the database regarding information changes from the LI site issuing the warrant.

S260: Information change of the target?

In the case the same target is received from another LI site, but the information of the target is changed, e.g. regarding different monitoring functionality, in respect to the existing information, the target information stored in the target warrant in the vPOI/TCF has to be updated, otherwise vPOI/TCF is not informed about the warrant on existing target. Example of such information change and warrant update is a first warrant for monitoring only on IRD and a second warrant requiring monitoring for both IRD and CC.

If the test step S260 indicates that an information change is not concerning a new functionality of the interception of the target's data communication traffic and flows, the result of the test is "no", and the method returns to a standby mode, wherein the method waits for a new warrant to be received. If the test step S260 indicates that an information change is concerning a new functionality of the interception of the target's data communication traffic and flows, the result of the test is "yes", and the method performs step S270:

S270: If information change of target, forwarding the received warrant to the POI and/or vPOI/TCF. In the flowchart, step S270 is indicated "Forward warrant".

Figure 7:
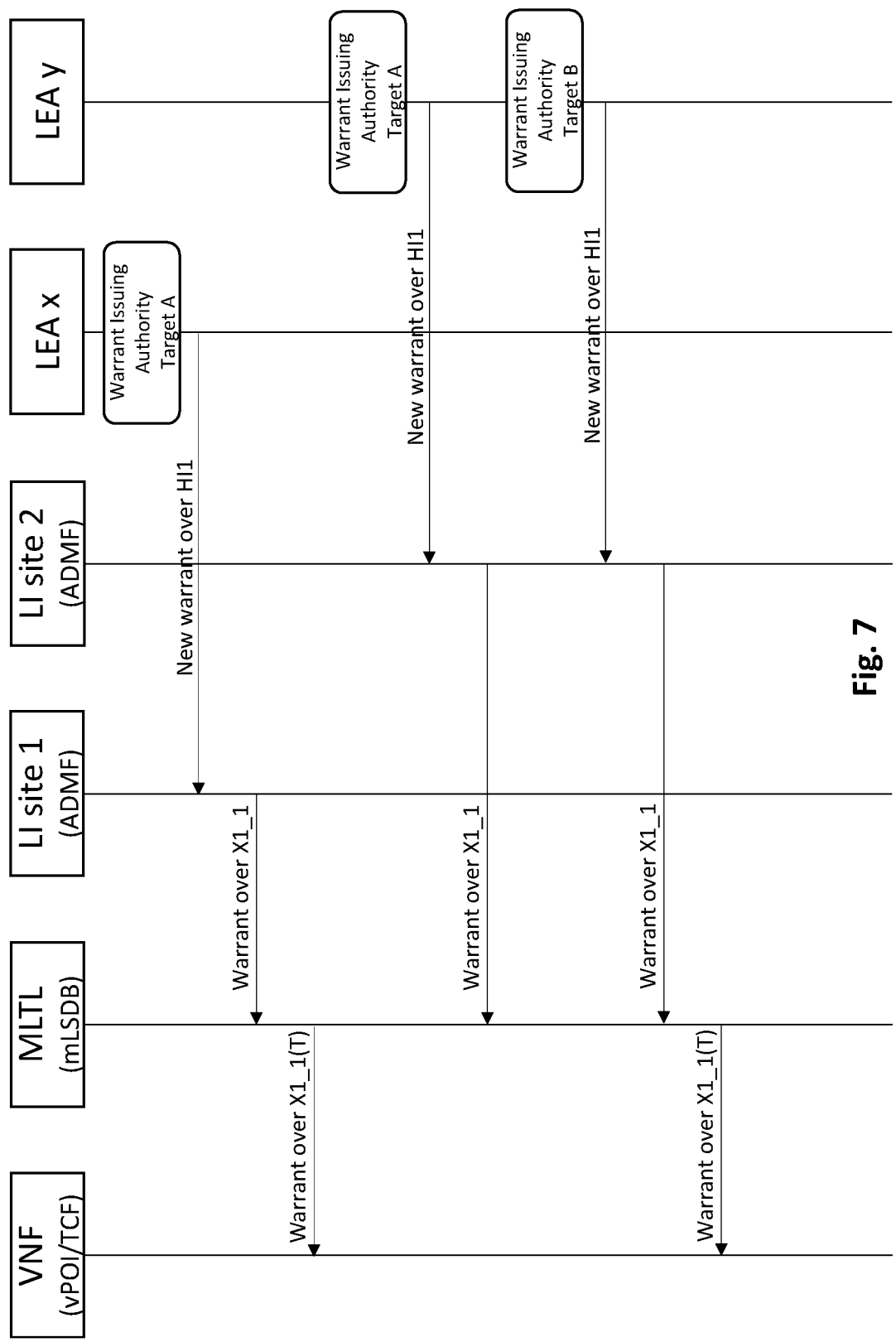
FIG. 7 is a signalling scheme illustrating examples of the warrant handling process operation.

FIG. 7 is a signalling scheme illustrating an example how the warrant handling process operates for handling warrants from different LEAs.

The signalling scheme illustrates an LI system and network architecture comprising a MLTL node having a mLSDB database. The MLTL node serves two LI sites, LI site 1 and LI site 2, each comprising an ADMF. LI site 1 is serving LEA x and LI site 2 is serving LEA y.

A Warrant Issuing Authority (132 in FIGS. 1-3), served by LEA x and LI site 1, generates and sends a new warrant regarding a Target A via its HI1 interface to LI site 1. The ADMF receives the warrant, handles the target information and forwards it via the X1_1 to the MLTL node. The warrant handling process S200 of the AF is started by said received warrant. The mLSDB 212 running the warrant handling process checks the target of the received warrant, and as this is a new target A, the target information of the warrant is stored in the database (see steps S220 and S230 of the S200 flowchart in FIG. 6). The warrant is forwarded to the VNF via interface X1_1 or X1_1T and the vPOI/TCF is informed and stores the new target A to be intercepted.

In another scenario, a Warrant Issuing Authority (132 in FIGS. 1-3), served by LEA y and LI site 2, generates and sends a new warrant regarding Target A via the HI1 interface to the LI site 2. The ADMF of the LI site 2 receives the warrant, handles the target information and forwards it towards the MLTL node via the X1_1 interface. The warrant handling process S200 is started by said received warrant. The mLSDB 212 running the warrant handling process checks the target of the received warrant, and as the target A is already stored in the database, the target information of the warrant is updated that in the database (see steps S250 and S260 of the S200 flowchart in FIG. 6) with the information that another warrant issuing authority and LEA served by another LI site, LI site 2, is interested of the interception results. The VNF and the vPOI/TCF do not need to be updated and the warrant is therefore not forwarded to the vPOI/TCF.

However, in a third scenario, if the warrant comprises a change of information, e.g. monitoring functionality, the mLSDB is updated about this information change and the warrant is forwarded to the vPOI/TCF via the X1_1 or X1_1T interface, respectively, for informing the vPOI/TCF about the information change (see steps S250, S260 and S270 of the S200 flowchart in FIG. 6).

In yet another scenario, the Warrant Issuing Authority (132 in FIGS. 1-3), served by LEA y and LI site 2, generates and sends a new warrant regarding a Target B via the HI1 interface to the LI site 2. The ADMF of the LI site 2 receives the warrant, handles the target information and forwards it towards the MLTL node via the X1_1 interface. The warrant handling process S200 of the AF is started by said received warrant. The mLSDB 212 running the warrant handling process checks the target of the received warrant and as this is a new target B, the target information of the warrant is stored in the database (see steps S220 and S230 of the S200 flowchart in FIG. 6. The warrant is forwarded to the VNF via interface X1_1 or X1_1T and the vPOI/TCF is informed and stores the new target B to be intercepted.

In the LI system and network, information is sent to the vPOI/TCF from the MLTL node. The information comprises:

Target info
  Type of target (MSISDN/MONB, IMSI, IMEI, IP Address, so on)
  Target Value (phone number, IMSI number, and so on)
Agency info (or profile info)
  Agency identifier (MUID Monitoring User identity, or agency identity)
  Target identifier (CASEID or other)
Monitoring Functionality for the target (depending by the agency)
  IRD (monitor for Data)
  CC (monitor for Call content)
  CRSS (monitor for Call Related Service)
  CISS (monitor for Call Independent (i.e. non call related) Service)
  So on Target Info are always sent to TCF/vPOI. Agency info could also not be sent, some LI sites do not inform the POI about the agencies requesting the monitoring. The LI sites, in this case, have to check any IRD/CC and dispatch to the right agency. It is proposed that MLTL do not send the Agency info, so that there are no impact at all on TCF/vPOI, otherwise some impacts can be needed. The number of MUIDs that the POI can handle is generally limited, the LI Site do this check. Connecting more LI Sites it is possible that more MUIDs than the maximum allowed MUIDs are connected to the same target. MLTL could do a check to avoid this, but in this case the Li site is informed that other LI site are monitoring the same target. It is therefore suggested to move the MUIDs handling inside the MLTL node so that no change are needed in VNF/vPOI/TCF (that for each target will see always only a MUID or no MUID at all) and in LI Site and no information about monitoring are shared among LI Sites.

Monitoring functionality is handled according to Agency info, i.e. if agency info is sent to the TCF/vPOI monitoring functionality are added to the agency info.

If agency info is not sent, there are 2 possible way:
 activate all possible monitoring functions on the VNF/vPOI, the LI site will discard the not needed monitoring (this can cause a lot of not needed traffic monitoring).
 Activate the functions that are requested at least by one agency.

As an example, LEA x requires to LI Site 1 (ADMF) to monitor only for IRD (Data) the MSISDN+39021234567. The LI Site 1 (ADMF) forwards the request to MLTL (mLSDB). The mLSDB stores in the DB by creating a new object in the database:
 Target type: MSISDN
 Target value: +39021234567
 IRD: Yes
 CC: No
 Other functionality: . . .
 Profile Info 1:
  MUID: LEA x
  LI Site: Li Site 1
  IRD: Yes
  CC: No
  Other functionality: . . .

MLTL (mLSDB) send to the TCF/vPOI the warrant info excluding the profile info:
 Target type: MSISDN
 Target value: +39021234567
 IRD: Yes
 CC: No
 Other functionality: . . .

From now on, the vPOI will send IRDs to MLTL for events involving MSISDN=+39021234567. No Call Content will be sent to MLTL.

After a while LEA y send to LI Site 2 (ADMF) a request to monitor for IRD and CC regarding the MSISDN+39021234567. LI Site 2 (ADMF) forward the request to MLTL (mLSDB)

The mLSDB update the existing object in the DB as follow:
 Target type: MSISDN
 Target value: +39021234567
 IRD: Yes
 CC: Yes
 Other functionality: . . .
 Profile Info 1:
  MUID: LEA x
  LI Site: Li Site 1
  IRD: Yes
  CC: No
  Other functionality: . . .
 Profile Info 2:
  MUID: LEA y
  LI Site: Li Site 2
  IRD: Yes
  CC: Yes
  Other functionality: . . .

The MLTL (mLSDB) has to update to the TCF/vPOI the warrant info previously given, to inform that now also CC is required:
 Target type: MSISDN
 Target value: +39021234567
 IRD: Yes
 CC: Yes
 Other functionality:

From now on, the vPOI will send IRDs and CC to MLTL for events involving MSISDN=+39021234567. Also Call Content will be sent to MLTL.

The TCF/vPOI DB update be done cancelling the previous warrant and inserting a new one or only updating the changed info, the important is that after the update the VNF will send both IRD and CC.

Figure 8:
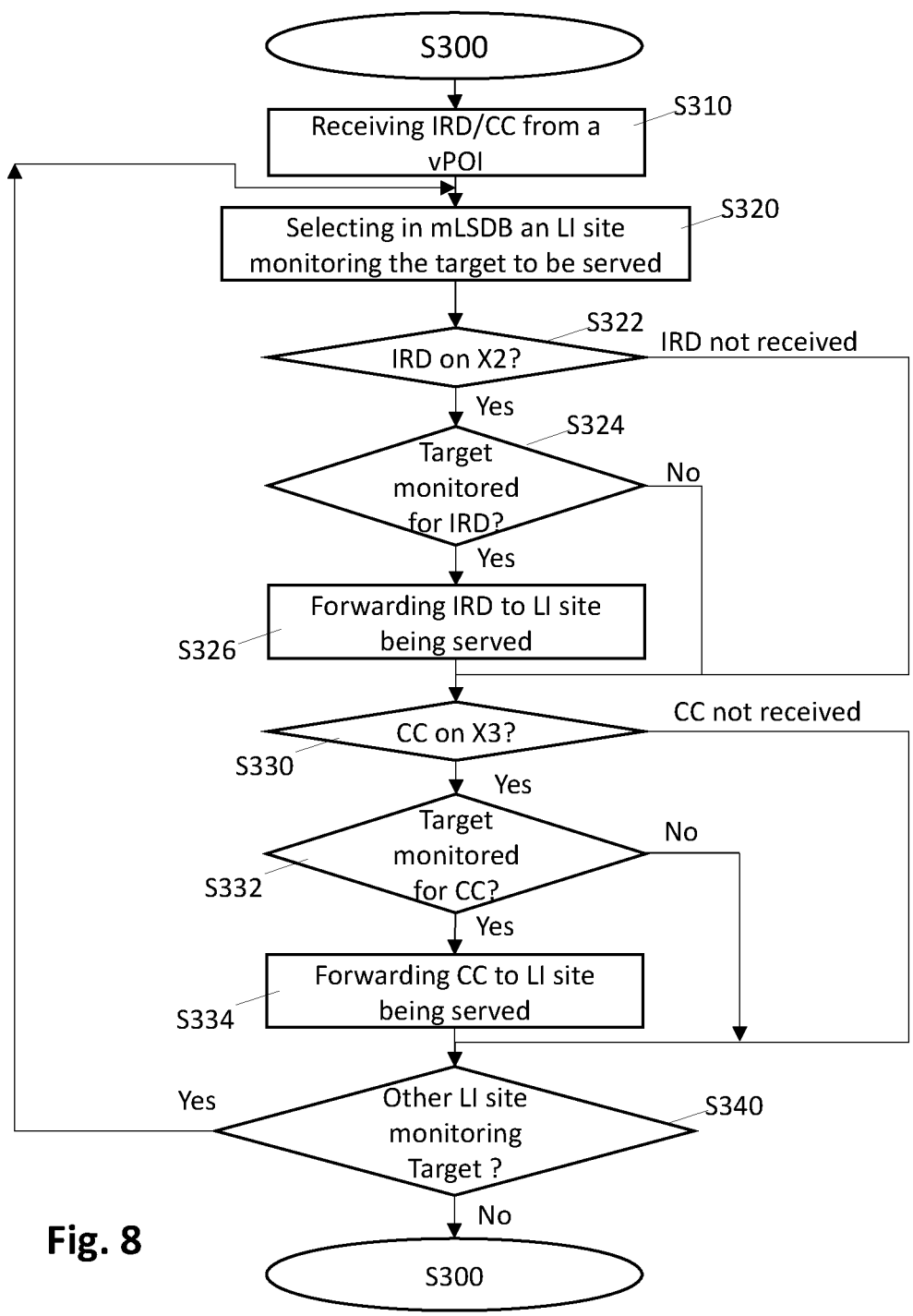
FIG. 8 is a flowchart of an embodiment of the IRD/CC handling process S300.

FIG. 8 is a flowchart of an embodiment of the IRD/CC handling process S300.

The method is performed by the MLTL node by means of the LI App ctrl (216 in FIG. 3A). The method distributes received IRD and/or CC from the POIs/vPOIs to one or more LI site by means of the database (212) storing information regarding targets, the used POI or vPOI/TCF and which LI sites that sent the warrants with the identified target. The method comprises following steps:

S310: —Receiving IRD and/or CC from a vPOI.

The method S300 is started when a new "IRD/CC is received" over the X2/X3 interfaces from a vPOI.

S320: —Selecting in mLSDB an LI site monitoring the target to be served.

An LI site is selected to be served by means of target information in the received IRD/CC, and the MLTL node continues with step S322 of the method.

S322: —IRD on X2?

In test step S322, it is checked whether IRD is received on the X2 interface, or not. If not, the result is "No", and the method continues to step S330. If IRD is received, the result is "Yes", and the MLTL node is configured to perform the check step S324.

S324: Target monitored for IRD?

In check step S324, it is checked whether the target's IRD is monitored for the LI site being served, or not. If not, the result is "No", and the method continues to s step 330. If IRD is monitored for the target, the result is "Yes", and the MLTL node is configured to perform step S326.

S326: —Forwarding IRD to the LI site being served.

The IRD is forwarded on the X2 interface to the selected LI site being served for the moment. The MLTL node then performs test step S330.

S330: —CC on X3?

In test step S330, it is checked whether CC is received on the X3 interface, or not. If not, the result is "No", and the method continues to step S340. If CC is received, the result is "Yes", and the MLTL node is configured to perform the check step S332.

S332: Target monitored for CC?

In check step S332, it is checked whether the target's CC is monitored for the LI site being served, or not. If not, the result is "No", and the method continues to step S340. If CC is monitored for the target, the result is "Yes", and the MLTL node is configured to perform step S334.

S334: —Forwarding CC to the LI site being served.

The CC is forwarded on the X3 interface to the selected LI site being served for the moment. The MLTL node then performs test step S340.

S340: —Other LI site monitoring target?

In check step S340, it is checked in the mLSDB whether there is another LI site monitoring the current target, or not.

If the current target is monitored by another LI site, the result is "Yes", and the MLTL node is configured to perform step S320. If not, the result is "No", and the method continues to stand by in step S300 wherein the MLTL node is waiting for new IRD/CC on X2/X3.

Figure 9:
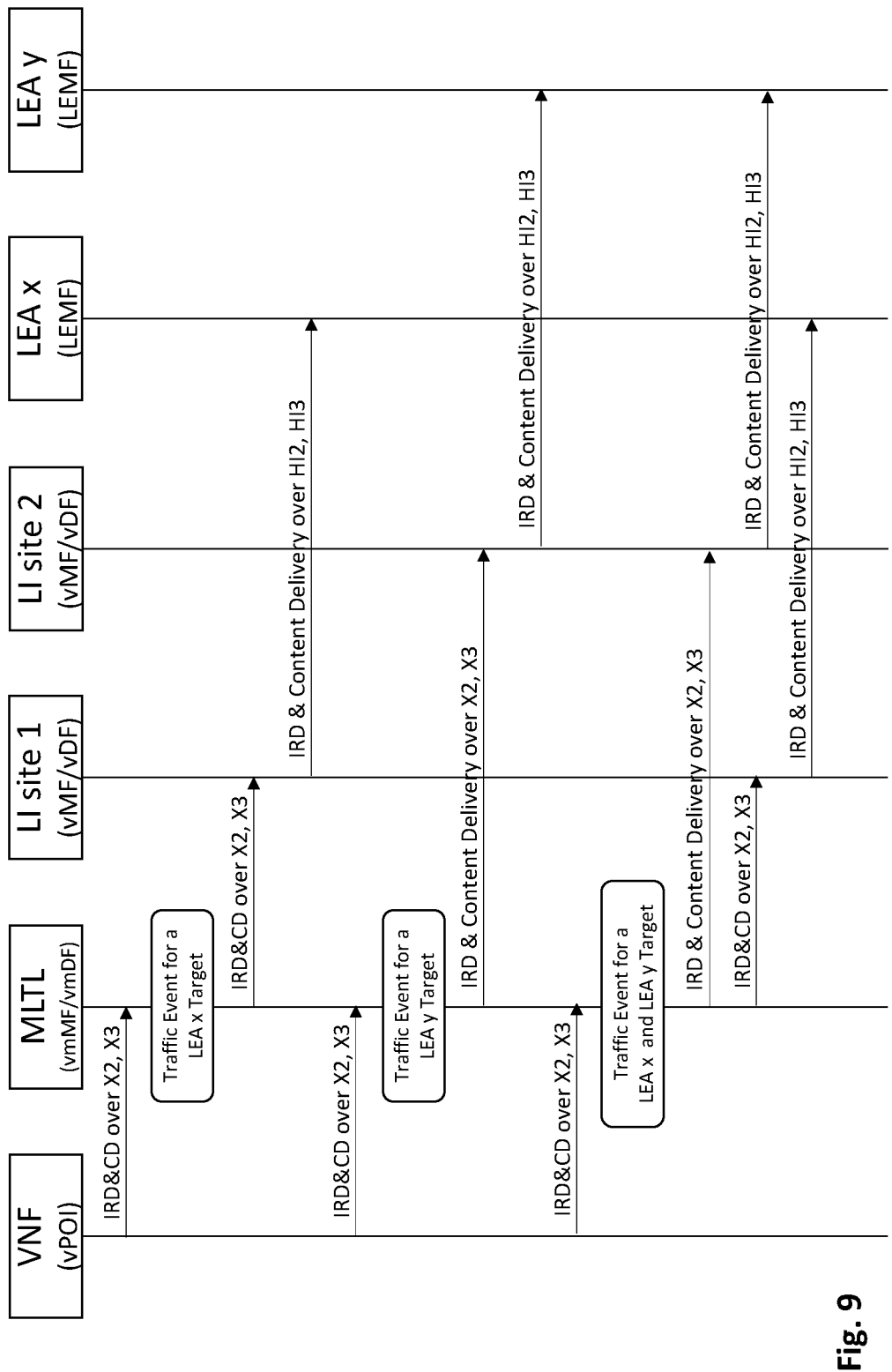
FIG. 9 is a signalling scheme illustrating different scenarios of the process S300.

FIG. 9 is a signalling scheme illustrating different scenarios of delivering IRD and CC from a VNF/vPOI to a LEA comprising a LEMF. In the signalling scheme of FIG. 9, it illustrated how the MLTL node dispatches different Intercept Related Data, IRD, and Content Communication, CC, to the MF/DF in the LI site where the related warrant was issued. In case the target is monitored by at least two LEAs, the MLTL is configured to forward the X2/X3 to all interested LI sites.

In FIG. 9, the signalling scheme illustrates an LI system and network architecture comprising a MLTL node having a mLSDB database. The MLTL node serves two LI sites, LI site 1 and LI site 2, each comprising an vMF/vDF. LI site 1 is serving LEA x and LI site 2 is serving LEA y, each having a LEMF function.

In a first scenario, when the vPOI have intercepted a target's session, or traffic event, communication of data communications traffic and data flows, the vPOI sends IRD from the target's traffic event over the X2 interface and CC over the X3 interface by means of the target's stored warrant information to the vmMF/vmDF of the MLTL node. The vmMF/vmDF is enabled by means of the stored target information in the mLSDB database to direct and forward the IRD over the X2 interface and CC over the X3 interface to the vMF/vDF of the LI site 1 where the related warrant was issued. In this first illustrated scenario, the monitored/intercepted traffic event belongs to one of the targets requested by LEA x served by LI site 1. The vMF/vDF of the LI site 1 is configured according to the standardized processes for IRD and CC delivery to send said IRD over the HI2 interface and CC over the HI3 interface to the LEMF of LEA x.

In a second scenario, when the vPOI have intercepted a target's session, or traffic event, communication of data communications traffic and data flows, the vPOI sends IRD from the target's traffic event over the X2 interface and CC over the X3 interface by means of the target's stored warrant information to the vmMF/vmDF of the MLTL node. The vmMF/vmDF is enabled by means of the stored target information in the mLSDB database to direct and forward the IRD over the X2 interface and CC over the X3 interface to the vMF/vDF of the LI site 2 where the related warrant was issued. In this second illustrated scenario, the monitored/intercepted traffic event belongs to one of the targets requested by LEA y served by LI site 2. The vMF/vDF of the LI site 2 is configured according to the standardized processes for IRD and CC delivery to send said IRD over the HI2 interface and CC over the HI3 interface to the LEMF of LEA y.

In a third scenario, when the vPOI have intercepted a target's traffic event, communication of data communications traffic and data flows, the vPOI sends IRD from the target's traffic event over the X2 interface and CC over the X3 interface by means of the target's stored warrant information to the vmMF/vmDF of the MLTL node. In this third scenario, the traffic event belongs to a target which is monitored by both the LEA x served by LI site 1 and LEA y served by LI site 2.

Different scenarios are possible. The scenarios are controlled in accordance to the information and monitoring request received in the warrants received by the mLSDB. In some scenarios that are not illustrated herein, it is possible that only one from IRD on X2 and CC on X3 are sent by VNF to MLTL. Further, it is possible that CC on X3 (or IRD on X2) are not forwarded to all the LI Site/LEAs.

The vmMF/vmDF is enabled by means of the stored target information in the mLSDB database to direct and forward the IRD over the X2 interfaces and CC over the X3 interfaces to both LI site 1 and LI site 2. The vMF/vDF of the LI site 1 and LI site 2 are configured according to the standardized processes for IRD and CC delivery to send said IRD over the HI2 interfaces and CC over the HI3 interfaces to the LEMF of LEA x and LEMF of LEA y.

Figure 10:
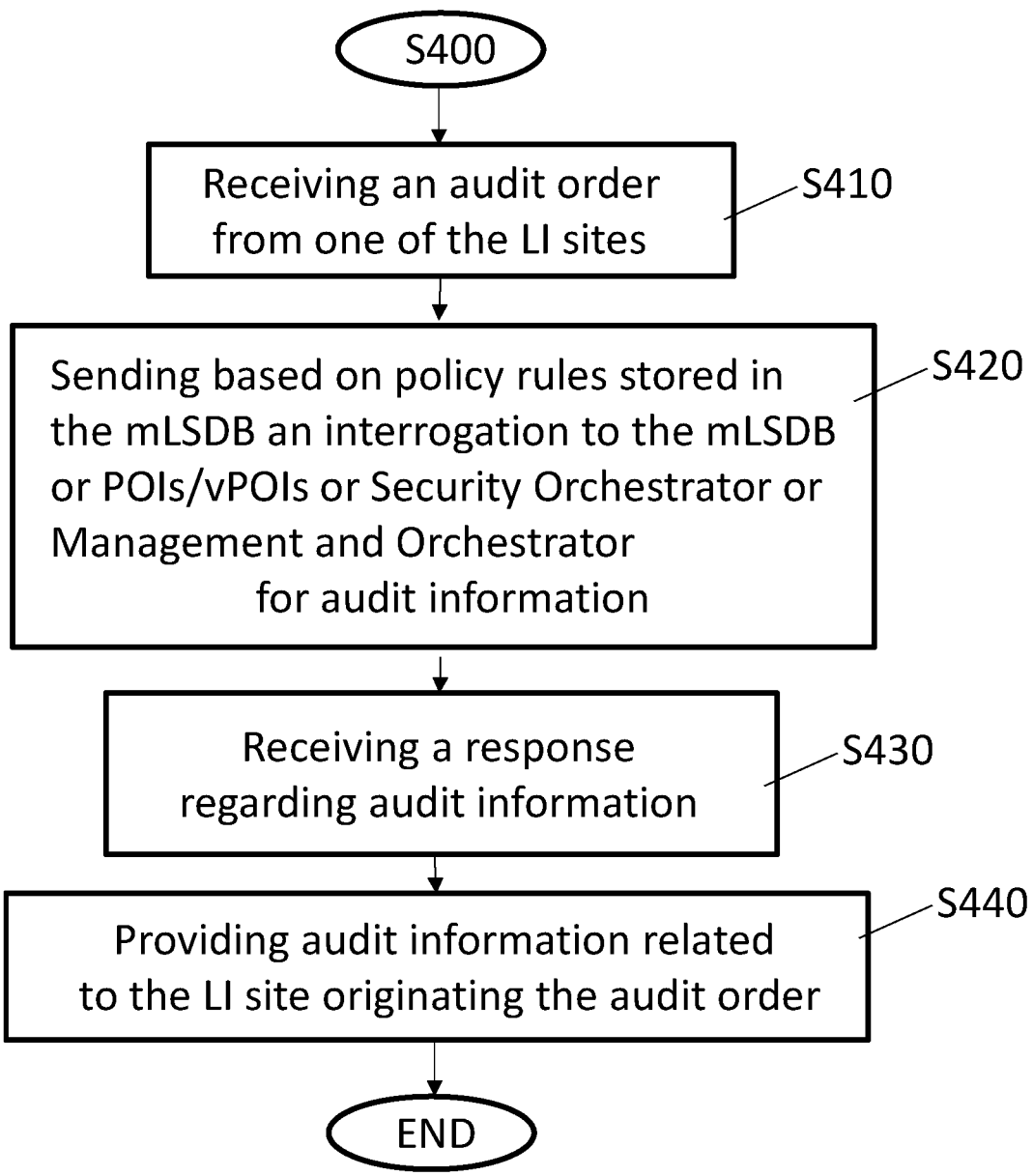
FIG. 10 is a flowchart of an audit information handling process S400.

FIG. 10 is a flowchart of an audit information handling process S400.

The mLSDB may order audit of secure configuration of the vPOI application configuration to the MLTL app controller and of the VNF level security to the MLTL NFV controller. Any audit request coming from an LI site about VNF shall be handled and the result shall be sent back only to the requesting LI Site. For instance if LI site order a target list audit, the result shall be provided only to the ordering LI site. LI site shall never get warrant information set by other LI sites.

The method S100 may further comprise an audit information handling process S400. Said process comprising the steps of:

S410: Receiving an audit order from one of the LI sites;
S420: Sending based on policy rules stored in the mLSDB an interrogation to the mLSDB or POIs/vPOIs or Security Orchestrator (144) or Management and Orchestrator (144) for audit information;
S430: Receiving a response regarding audit information; and
S440: Providing audit information related to the LI site originating the audit order.

The MLTL node may be used in different LI system and network architectures. In FIGS. 3*a* and 3B, is one embodiment of a such LI architecture, wherein the MLTL node allows that each vPOI sees only one LI site, i.e. the MLTL, and LI sites are separated among them in case of Triggered vPOI. More than one vPOI*s*/TCFs are possible to be connected to the same MLTL.

Figure 11:
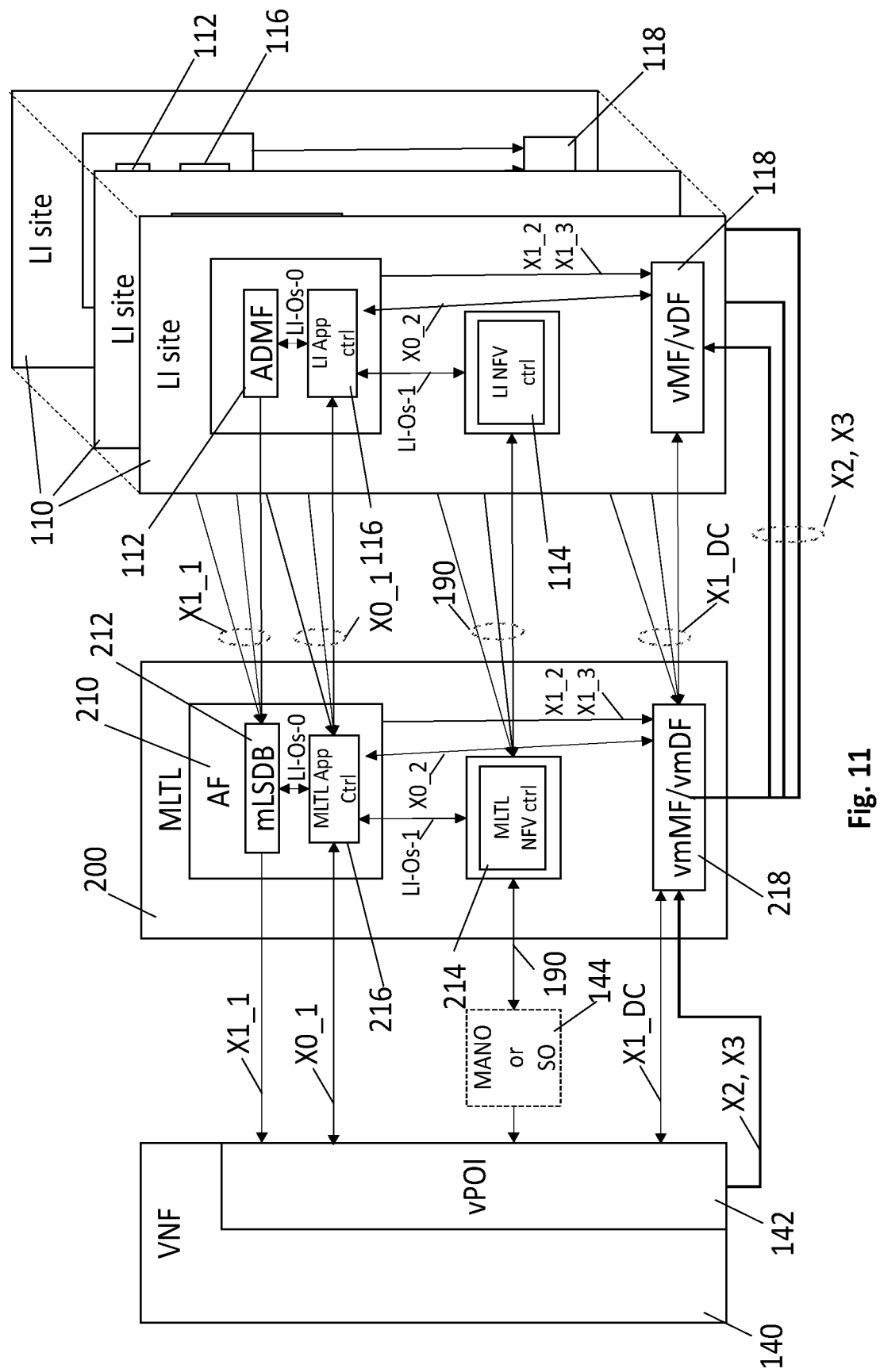
FIG. 11 is a block diagram of a LI system and network infrastructure 100 according the proposed solution herein.

In FIG. 11 is illustrated an alternative embodiment LI system and network infrastructure 100 according the proposed solution herein.

The LI system and network is an embodiment of a High level description of MLTL node in a Trusted Virtualized LI Architecture in case of a Direct Provisioned vPOI. In the illustrated LI infrastructure the vPOI is only able to see one LI site, i.e. the MLTL node. The LI sites are separated among them. It should be noted that more than one VNF/vPOI may be connected to the same MLTL.

In FIG. 12 is illustrated further one embodiment of a LI system and network infrastructure 100 according the proposed solution herein.

The LI system and network infrastructure comprises an MLTL node 200 wherein the TCF function 146 is embedded in the MLTL node. This configuration applies when the MLTL is in a protected infrastructure close to the VNF/vPOI. The TCF function is a multi Triggering Control Function, mTCF, 148, which provides the same functionality as a standalone TCF. In this configuration a node internal interface could replace the X1_1T for target configuration. In the implementation it could also access directly the target list in mLSDB.

In FIG. 13 is illustrated further one embodiment of a LI system and network infrastructure 100 according the proposed solution herein.

In the illustrated embodiment of a LI system and network infrastructure 100, the MLTL functionality 200 is embedded in the vPOI. All LI sites 110 are directly connected to the vPOI. It is up to the vPOI to guarantee the separation of duty to each separate LI site 110. The separation of duty is enabled by the information stored in the mLSDB 212.

The method S100 and the processes S200, S300, and S400 described above may be implemented in digital electronically circuitry, or in computer hardware, firmware, software, or in combinations of them. Devices may be implemented in a computer program product tangibly embodied in a machine readable storage device for execution by a programmable processor; and method steps may be performed by a programmable processor executing a program of instructions to perform functions of the invention by operating on input data and generating output.

The method and the processes may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially-designed ASICs (Application Specific Integrated Circuits).

The components and elements described above with reference to FIGS. 1, 2A, 2B, 3A, 3B, 11, 12, and 13 are logical components and elements, and do not necessarily correspond to separate physical components and elements. Thus, the person skilled in the art would appreciate that the components and elements disclosed in the figures may be implemented as physically integrated components and elements, and/or physically separate components and elements, and that the components and elements are provided with appropriate processing circuits.

A number of embodiments of the technique have been described. It will be understood that various modifications may be made without departing from the technical solution. Therefore, other implementations are within the scope of the following claims.

The invention claimed is:

1. A method performed in a node for connecting at least two Lawful Interception (LI) sites to the same Physical Networks Function (PNF) comprising a Point Of Interception (POI) or Virtual Networks Function (VNF) comprising a virtualised Point Of Interception (vPOI) controlled by a Triggering Control Function (TCF) for lawful interception of the data communication sessions of targets defined by warrants comprising information identifying the targets, wherein said node is adapted to configure the POIs/vPOIs/TCFs according to LI sites requests and policy requirements for each LI site, the method comprising:

enabling the POI or vPOI/TCF to serve more than one LI site at the same time, wherein the enabling comprises:
handling warrants received from LI sites for distribution to POIs/vPOIs/TCFs; and
distributing received Intercept Related Information (IRD) and/or Communications Content (CC) from the POIs/vPOIs to one or more LI site using a database storing information regarding targets, wherein
the information regarding targets comprises information regarding a first target, and
the information regarding the first target comprises a first target identifier identifying the first target and an LI site identifier identifying an LI site from which a warrant identifying the first target was received, and
the method further comprises:
receiving from a first LI site a first warrant that identifies the first target; and
after receiving the first warrant, determining that the database does not contain information linking the first target with the first LI site, and
the storing of information regarding targets comprises adding to the database information linking the first target identifier with a first LI site identifier identifying the first LI site as a result of determining that the database does not contain information linking the first target with the first LI site.

2. The method of claim 1, wherein the method further comprises a warrant handling process comprising:
receiving from an LI site a warrant comprising information identifying a target; and
determining whether the target is present in the database.

3. The method of claim 2, wherein the warrant handling process further comprises:
as a result of determining that the target is not present in the database, updating the database regarding information from the LI site issuing the warrant; and
forwarding the received warrant to the POI and/or vPOI/TCF.

4. The method of claim 2, wherein the warrant handling process further comprises:
as a result of determining that the target is present in the database, updating the database regarding information changes from the LI site issuing the warrant; and
if information change of target, forwarding the received warrant to the POI and/or vPOI/TCF.

5. The method of claim 1, wherein the method comprises an audit information handling process comprising:
receiving an audit order from one of the LI sites;
sending based on policy rules stored in the mLSDB an interrogation to the mLSDB or POIs/vPOIs or Security Orchestrator or Management and Orchestrator for audit information;
receiving a response regarding audit information; and
providing audit information related to the LI site originating the audit order.

6. The method of claim 1, wherein the node comprises a node controller, which involves at least a controller on service application level and a controller on Network Function Virtualization level.

7. The method of claim 1, wherein the method is configured to enable the node to act as a proxy between one or more POI/vPOI/TCF and one or more LI sites, wherein the mLSDB and vmMF/vmDF of the node are configured to communicate with POI/vPOI/TCF as an ADMF and vMF/vDF, respectively, of an LI site, and vice versa.

8. The method of claim 1, wherein the mLSDB is configured besides the same functionality as an ADMF of a LI site to perform at least one of the following functionalities:
  collecting information from warrants from all LI sites;
  providing target list management on LI site base;
  forwarding target lists to vPOI;
  forwarding the targets from different LI sites only once to the vPOI/TCF;
  Registering dynamic creation, modification, termination of vPOIs and their types, mMF/vDF and network topology;
  Ordering audit secure configuration of the vPOI application configuration to a MLTL app controller and of the VNF level security to a MLTL NFV controller;
  acting as the root key and Certificate Authority (CA) for all other MLTL functions and components.

9. A node for connecting at least two Lawful Interception (LI) sites to the same Physical Networks Function (PNF) comprising a Point Of Interception (POI) or Virtual Networks Function (VNF) comprising a virtualised Point Of Interception (vPOI) controlled by a Triggering Control Function (TCF) for lawful interception of the data communication sessions of targets defined by warrants comprising information identifying the targets, wherein said node comprises a node controller comprising one or more programmable processors configured to control configuration of the POIs/vPOIs/TCFs of LI sites requests and policy requirements for each LI site, and to co-operate with an Administration Function (AF) of the node, said AF comprising a multi LI Site database (mLSDB) enabling the POI or vPOI/TCF to serve more than one LI site at the same time, wherein:
  the AF component is configured to handle warrants received from LI sites for distribution to POIs/vPOIs/TCFs; and
  a virtualized multi Mediation Function and virtualized multi Delivery Function (vmMF/vmDF) component configured to distribute received Intercept Related Information (IRD) and/or Communications Content (CC) from the POIs/vPOIs to one or more LI site using the database storing information regarding targets, wherein
  the information regarding targets comprises information regarding a first target,
  the information regarding the first target comprises a first target identifier identifying the first target and an LI site identifier identifying an LI site from which a warrant identifying the first target was received,
  the AF component comprises a receiver for receiving from a first LI site a first warrant that identifies the first target; and
  the AF component is further configured such that, after receiving the first warrant, the AF component determines whether the database contains information linking the first target with the first LI site, and
  the AF component is further configured to add to the database information linking the first target identifier with a first LI site identifier identifying the first LI site as a result of determining that the database does not contain information linking the first target with the first LI site.

10. The node of claim 9, wherein the node comprises a controller for controlling the AF, wherein the mLSDB is configured to execute a warrant handling process comprising:
  receiving from an LI site a warrant comprising information identifying a target; and
  identifying if the target of a received warrant already is present in the database.

11. The node of claim 10, wherein the warrant handling process further comprises:
  as a result of determining that the target is not present in the database, updating the database regarding information from the LI site issuing the warrant; and
  forwarding the received warrant to the POI and/or vPOI/TCF.

12. The node of claim 10, wherein the warrant handling process further comprises:
  as a result of determining that the target is present in the database, updating the database regarding information changes from the LI site issuing the warrant; and
  if information change of target, forwarding the received warrant to the POI and/or vPOI/TCF.

13. The node of claim 9, wherein the node comprises a controller configured for handling audit information by:
  receiving an audit order from one of the LI sites;
  sending based on policy rules stored in the mLSDB an interrogation to the mLSDB or POIs/vPOIs or Security Orchestrator or Management and Orchestrator for audit information;
  receiving a response regarding audit information; and
  providing audit information related to the LI site originating the audit order.

14. The node of claim 9, wherein the TCF is embedded within the node, said TCF controlling at least one vPOI and having direct access to the mLSDB.

15. The node of any of claim 9, wherein the node is embedded within the POI/vPOI.

16. The node of any of claim 9, wherein the node comprises a node controller, which involves at least a controller on service application level and a controller on Network Function Virtualization level.

17. The node of claim 9, wherein the node acts as a proxy between one or more POI/vPOI/TCF and one or more LI sites, wherein the mLSDB and vmMF/vmDF of the node are configured to communicate with POI/vPOI/TCF as an ADMF and vMF/vDF, respectively, of an LI site, and vice versa.

18. The node of claim 9, wherein the mLSDB is configured besides the same functionality as an ADMF of a LI site to perform at least one of the following functionalities:
  collecting information from warrants from all LI sites;
  providing target list management on LI site base;
  forwarding target lists to vPOI;
  forwarding the targets from different LI sites only once to the vPOI/TCF;
  Registering dynamic creation, modification, termination of vPOIs and their types, vmMF/vmDF and network topology;
  Ordering audit secure configuration of the vPOI application configuration to a MLTL app controller and of the VNF level security to a MLTL NFV controller;
  acting as the root key and Certificate Authority for all other MLTL functions and components.

19. A non-transitory computer readable medium storing a computer program comprising computer program code which, when run by a processor of a node for connecting at least two Lawful Interception sites to a Physical Networks Function, causes the node to perform the method of claim 1.

20. The method of claim 1, wherein
  handling warrants received from LI sites comprises: i) receiving a first warrant from a first LI site, wherein the first warrant identifies the first target, ii) determining that the database does not contain information linking the first target with any LI site, and iii) as a result of determining that the database does not contain information linking the first target with any LI site, updating the database to contain a record comprising a target identifier identifying the first target and an LI site identifier identifying the first LI site; and distributing received IRD and/or (CC) comprises: i) determining a target associated with the received IRD and/or CC, ii) using the database to identify an LI site with which the determined target is associated, and iii) forwarding the IRD and/or CC to the identified LI site.

21. A method, comprising:

receiving a first warrant from a first Lawful Interception (LI) site, wherein the first warrant identifies a first target;

after receiving the first warrant, determining that a database does not contain information linking the first target with the first LI site; and as a result of determining that the database does not contain information linking the first target with the first LI site, adding to the database information linking the first target with the first LI site, wherein adding the information to the database comprises adding a target record to the database, wherein the target record comprises a target identifier identifying the first target and a first LI site identifier identifying the first LI site.

22. The method of claim 21, further comprising:

after adding the target record to the database, receiving a second warrant from a second LI site, wherein the second warrant identifies the first target;

in response to receiving the second warrant, adding to the target record a second LI site identifier identifying the second LI site, wherein after adding to the target record the second LI site identifier identifying the second LI site, the target record comprises the target identifier, the first LI site identifier, and the second LI site identifier.

23. The method of claim 22, further comprising:

receiving information regarding the first target;

in response to receiving the information regarding the first target, determining, based on the target record stored in the database, that the first target is linked to the first LI site and the second LI site; and forwarding the information regarding the target to the first LI site and the second LI site.

* * * * *